US008526543B2

(12) United States Patent
Chrabieh et al.

(10) Patent No.: US 8,526,543 B2
(45) Date of Patent: *Sep. 3, 2013

(54) QUADRATURE IMBALANCE ESTIMATION USING UNBIASED TRAINING SEQUENCES

(75) Inventors: Rabih Chrabieh, San Diego, CA (US); Samir S Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/180,393

(22) Filed: Jul. 11, 2011

(65) Prior Publication Data

US 2012/0039421 A1    Feb. 16, 2012

Related U.S. Application Data

(63) Continuation of application No. 11/853,808, filed on Sep. 11, 2007, now Pat. No. 8,064,550, which is a continuation of application No. 11/755,719, filed on May 30, 2007, now Pat. No. 8,290,083, and a continuation-in-part of application No. 11/684,566, filed on Mar. 9, 2007, now Pat. No. 8,428,175.

(60) Provisional application No. 60/896,480, filed on Mar. 22, 2007.

(51) Int. Cl.
*H04L 27/00* (2006.01)

(52) U.S. Cl.
USPC ........... 375/324; 375/141; 375/231; 375/260; 375/267; 375/296; 375/316

(58) Field of Classification Search
USPC ................. 370/203, 204, 205, 208, 209, 210, 370/320, 335, 342, 441, 479, 515; 375/141, 375/231, 260, 267, 316, 324, 296; 708/300, 708/427, 809, 829
See application file for complete search history.

(56) References Cited

U.S. PATENT DOCUMENTS

| 5,103,459 A | 4/1992 | Gilhousen et al. |
| 5,852,630 A | 12/1998 | Langberg et al. |

(Continued)

FOREIGN PATENT DOCUMENTS

| CN | 1579063 A | 2/2005 |
| CN | 1682509 A | 10/2005 |

(Continued)

OTHER PUBLICATIONS

Bagheri R et al: "Compensation Schemes and Performance Analysis of IQ Imbalances in OFDM Receivers" IEEE Transactions on Signal Processing, IEEE Service Center, New York, NY, US, vol. 53, No. 8, (Aug. 1, 2005), pp. 3257-3268, XP011136506 ISSN: 1053-587X.

(Continued)

*Primary Examiner* — Dhaval Patel
(74) *Attorney, Agent, or Firm* — QUALCOMM IP Department; James Hunt Yancey, Jr.

(57) ABSTRACT

A system and method are provided for removing quadrature imbalance errors in received data. The method accepts an unbiased training sequence in a quadrature demodulation receiver. An unbiased training sequence has a uniform accumulated power evenly distributed in a complex plane, and includes predetermined reference signals (p) at frequency +f and predetermined mirror signals ($p_m$) at frequency −f. The unbiased training sequence is processed, generating a sequence of processed symbols (y) at frequency +f, representing complex plane information in the unbiased training sequence. Each processed symbol (y) is multiplied by the mirror signal ($p_m$), and an unbiased quadrature imbalance estimate $B_m$ is obtained at frequency (−f). Using quadrature imbalance estimates, channel estimates, and processed symbols, an imbalance-corrected symbol can be generated.

20 Claims, 9 Drawing Sheets

(56) References Cited

U.S. PATENT DOCUMENTS

| | | | |
|---|---|---|---|
| 5,886,584 A | 3/1999 | Tanai et al. | |
| 5,920,808 A | 7/1999 | Jones et al. | |
| 5,960,040 A | 9/1999 | Cai et al. | |
| 6,009,073 A | 12/1999 | Kaneko | |
| 6,166,622 A | 12/2000 | Hosur et al. | |
| 6,259,928 B1 | 7/2001 | Vembu | |
| 6,404,824 B1 | 6/2002 | Bell et al. | |
| 6,493,396 B1 | 12/2002 | Nguyen et al. | |
| 7,020,226 B1 | 3/2006 | Kirkland | |
| 7,058,368 B2 | 6/2006 | Nicholls et al. | |
| 7,113,559 B2 | 9/2006 | Baas et al. | |
| 7,233,629 B2 | 6/2007 | Auranen | |
| 7,248,625 B2 | 7/2007 | Chien | |
| 7,251,291 B1 | 7/2007 | Dubuc et al. | |
| 7,313,203 B2 | 12/2007 | Tubbax et al. | |
| 7,366,255 B1 | 4/2008 | Hwang et al. | |
| 7,385,617 B2 | 6/2008 | Tahat | |
| 7,415,074 B2 | 8/2008 | Seto et al. | |
| 7,443,783 B2 | 10/2008 | DeChamps et al. | |
| 7,453,794 B2 | 11/2008 | Fang et al. | |
| 7,529,306 B2 | 5/2009 | Brotje et al. | |
| 7,542,519 B2* | 6/2009 | McCallister | 375/297 |
| 7,626,921 B2 | 12/2009 | Egashira et al. | |
| 7,627,295 B2* | 12/2009 | Takahiko et al. | 455/139 |
| 7,697,620 B2 | 4/2010 | Kroeger et al. | |
| 8,081,695 B2 | 12/2011 | Chrabieh et al. | |
| 8,428,175 B2 | 4/2013 | Chrabieh | |
| 2002/0012380 A1 | 1/2002 | Hottinen et al. | |
| 2002/0191713 A1 | 12/2002 | McVey | |
| 2003/0072254 A1 | 4/2003 | Ma et al. | |
| 2003/0156656 A1 | 8/2003 | Ojard et al. | |
| 2004/0095899 A1 | 5/2004 | Murakami et al. | |
| 2004/0184398 A1 | 9/2004 | Walton et al. | |
| 2004/0264583 A1 | 12/2004 | Ahmed | |
| 2005/0025113 A1 | 2/2005 | Lestable | |
| 2005/0058102 A1 | 3/2005 | Santhoff et al. | |
| 2005/0070322 A1 | 3/2005 | Tayloe et al. | |
| 2005/0213676 A1 | 9/2005 | Stopler | |
| 2005/0276354 A1 | 12/2005 | Su et al. | |
| 2005/0281239 A1 | 12/2005 | Williams | |
| 2005/0283715 A1 | 12/2005 | Sutivong et al. | |
| 2006/0104341 A1 | 5/2006 | Magee et al. | |
| 2006/0132338 A1 | 6/2006 | Katakura et al. | |
| 2006/0198461 A1 | 9/2006 | Hayase | |
| 2006/0203795 A1 | 9/2006 | Welborn et al. | |
| 2007/0121757 A1 | 5/2007 | Chu et al. | |
| 2007/0223393 A1 | 9/2007 | Urushihara et al. | |
| 2008/0037410 A1 | 2/2008 | Egashira et al. | |
| 2008/0130779 A1 | 6/2008 | Levi et al. | |
| 2008/0140770 A1 | 6/2008 | DelloStritto et al. | |
| 2008/0219379 A1 | 9/2008 | Chrabieh | |
| 2008/0219386 A1 | 9/2008 | Chrabieh et al. | |
| 2008/0240289 A1 | 10/2008 | Murakami et al. | |
| 2009/0213949 A1 | 8/2009 | Javaudin | |

FOREIGN PATENT DOCUMENTS

| | | |
|---|---|---|
| CN | 1697432 A | 11/2005 |
| EP | 0206203 A2 | 12/1986 |
| EP | 0246055 A2 | 11/1987 |
| EP | 1501251 A2 | 1/2005 |
| JP | 2001119364 A | 4/2001 |
| JP | 2004173281 A | 6/2004 |
| JP | 2005252631 A | 9/2005 |
| JP | 2005527152 A | 9/2005 |
| JP | 2006186581 A | 7/2006 |
| JP | 2006245871 A | 9/2006 |
| JP | 2006526348 A | 11/2006 |
| JP | 2007060106 A | 3/2007 |
| JP | 2007142674 A | 6/2007 |
| JP | 2007180618 A | 7/2007 |
| JP | 2007208654 A | 8/2007 |
| JP | 2008017145 A | 1/2008 |
| JP | 2008236704 A | 10/2008 |
| JP | 2010521125 | 6/2010 |
| RU | 2125344 | 1/1999 |
| RU | 2154897 C2 | 8/2000 |
| RU | 2233032 C2 | 7/2004 |
| RU | 2235429 | 8/2004 |
| RU | 2235435 C2 | 8/2004 |
| TW | I261976 B | 9/2006 |
| TW | I267263 B | 11/2006 |
| TW | I268672 | 12/2006 |
| TW | I269540 B | 12/2006 |
| WO | 9631952 A1 | 10/1996 |
| WO | 0079710 A1 | 12/2000 |
| WO | WO0131867 A1 | 5/2001 |
| WO | WO0191318 A1 | 11/2001 |
| WO | WO03101064 A1 | 12/2003 |
| WO | WO2004025918 | 3/2004 |
| WO | 2004107697 A1 | 12/2004 |
| WO | WO2005094028 A1 | 10/2005 |
| WO | WO2008112588 | 9/2008 |

OTHER PUBLICATIONS

Giugno L. et al.: "Low-Complexity Gain and Phase I/Q Mismatch Compensation using Orthogonal Pilot Sequences," EUSIPCO Sep. 2006.

Guanbin Xing et al: "Frequency offset and I/Q imbalance compensation for OFDM direct-conversion receivers" 2003 IEEE International Conference on Acoustics, Speech, and Signal Processing (ICASSP), vol. 4, 6. pp. IV_708-1V_711, XP010641258.

Jan Tubbax et al.: "Compensation of IQ imbalance in OFDM systems," pp. 3403-3407, IEEE publications 2003.

Liu H et al: "Frequency Offset and I/Q Imbalance Compensation for Direct-Conversion Receivers" IEEE Transactions on Wireless Communications, IEEE Service Center, Piscataway, NJ, US, vol. 4, nb. 2, (Mar. 1, 2005), pp. 673-680. XP011129220 ISSN: 1536-1276.

Windisch M. et al.: "Preamble Design for an Efficient I/Q Imbalance Compensation in OFDM Direct-Conversion Receivers," Proc. 10th Int. OFDM Workshop (InOWo'05), Aug. 2005.

International Search Report—PCT/US2008/056329, International Search Authority—European Patent Office—Jun. 24, 2008.

Taiwan Search Report—TW097108423—TIPO—Dec. 21, 2012.

Written Opinion—PCT/US2008/056329, International Search Report—European Patent Office—Jun. 24, 2008.

* cited by examiner

QUADRATURE IMBALANCE ESTIMATION USING UNBIASED TRAINING SEQUENCES

CLAIM OF PRIORITY UNDER 35 U.S.C. §119

The present application for patent claims priority to Provisional Application No. 60/896,480, filed Mar. 22, 2007, entitled, QUADRATURE IMBALANCE MITIGATION USING UNBIASED TRAINING SIGNALS, status Pending.

CLAIM OF PRIORITY UNDER 35 U.S.C. §120

The present application for patent is a continuation of patent application Ser. No. 11/853,808, filed Sep. 11, 2007, entitled, QUADRATURE IMBALANCE ESTIMATION USING UNBIASED TRAINING SEQUENCES, status allowed; assigned to the assignee hereof and hereby expressly incorporated by reference herein.

The present application for patent is a continuation-in-part of patent application Ser. No. 11/684,566, filed Mar. 9, 2007, entitled, QUADRATURE MODULATION ROTATING TRAINING SEQUENCE, status pending; assigned to the assignee hereof and hereby expressly incorporated by reference herein.

The present application for patent is a continuation-in-part of patent application Ser. No. 11/755,719, filed May 30, 2007, entitled, QUADRATURE IMBALANCE MITIGATION USING UNBIASED TRAINING SEQUENCES, status pending, assigned to the assignee hereof and hereby expressly incorporated by reference herein.

The present application for patent is related to U.S. patent application entitled, CHANNEL ESTIMATION USING FREQUENCY SMOOTHING, having Ser. No. 11/853,809, filed concurrently herewith, and assigned to the assignee, which is hereby incorporated by reference in its entirety.

BACKGROUND

1. Field

This invention relates generally to communication channel estimation and, more particularly, to systems and methods for improving the use of quadrature modulation unbiased training sequences in the training of receiver channel estimates, by removing quadrature imbalance errors.

2. Background

FIG. 1 is a schematic block diagram of a conventional receiver front end (prior art). A conventional wireless communications receiver includes an antenna that converts a radiated signal into a conducted signal. After some initial filtering, the conducted signal is amplified. Given a sufficient power level, the carrier frequency of the signal may be converted by mixing the signal (down-converting) with a local oscillator signal. Since the received signal is quadrature modulated, the signal is demodulated through separate I and Q paths before being combined. After frequency conversion, the analog signal may be converted to a digital signal, using an analog-to-digital converter (ADC), for baseband processing. The processing may include a fast Fourier transform (FFT).

There are a number of errors that can be introduced into the receiver that detrimentally affect channel estimations and the recovery of the intended signal. Errors can be introduced from the mixers, filters, and passive components, such as capacitors. The errors are exacerbated if they cause imbalance between the I and Q paths. In an effort to estimate the channel and, thus, zero-out some of these errors, communication systems may use a message format that includes a training sequence, which may be a repeated or predetermined data symbol. Using an Orthogonal Frequency Division Multiplexing (OFDM) system for example, the same IQ constellation point may be transmitted repeatedly for each subcarrier.

In an effort to save power in portable battery-operated devices, some OFDM systems use only a single modulation symbol for training. For example, a unique direction in the constellation (e.g., the I path) is stimulated, while the other direction (e.g., the Q path) is not. The same type of unidirectional training may also be used with pilot tones. Note: scrambling a single modulation channel (e.g., the I channel) with ±1 symbol values does not rotate the constellation point, and provides no stimulation for the quadrature channel.

In the presence of quadrature path imbalance, which is prevalent in large bandwidth systems, the above-mentioned power-saving training sequence results in a biased channel estimate. A biased channel estimate may align the IQ constellation well in one direction (i.e., the I path), but provide quadrature imbalance in the orthogonal direction. It is preferable that any imbalance be equally distributed among the two channels.

FIG. 2 is a schematic diagram illustrating quadrature imbalance at the receiver side (prior art). Although not shown, transmitter side imbalance is analogous. Suppose that the Q path is the reference. The impinging waveform is $\cos(\omega t+\theta)$, where $\theta$ is the phase of the channel. The Q path is down-converted with $-\sin(\omega t)$. The I path is down-converted with $(1+2\epsilon)\cos(\omega t+2\Delta\phi)$. $2\Delta\phi$ and $2\epsilon$ are hardware imbalances, respectively a phase error and an amplitude error. The low pass filters $H_I$ and $H_Q$ are different for each path. The filters introduce additional amplitude and phase distortion. However, these additional distortions are lumped inside $2\Delta\phi$ and $2\epsilon$. Note: these two filters are real and affect both $+\omega$ and $-\omega$ in an identical manner.

Assuming the errors are small:

$$(1+2\epsilon)\cos(\omega t+2\Delta\phi) \approx (1+2\epsilon)\cos(\omega t)-2\Delta\phi \cdot \sin(\omega t)$$

The first component on the right hand side, $\cos(\omega t)$, is the ideal I path slightly scaled. The second component, $-2\Delta\phi \cdot \sin(\omega t)$, is a small leakage from the Q path. After down-conversion of the impinging waveform:

in the I path: $(1+2\epsilon)\cos(\theta)+2\epsilon \cdot \sin(\theta)$.

in the Q path: $\sin(\theta)$.

The errors result in the misinterpretation of symbol positions in the quadrature modulation constellation, which in turn, results in incorrectly demodulated data.

SUMMARY

Wireless communication receivers are prone to errors caused by a lack of tolerance in the hardware components associated with mixers, amplifiers, and filters. In quadrature demodulators, these errors can also lead to imbalance between the I and Q paths, resulting in improperly processed data.

A training signal can be used to calibrate receiver channels. However, a training signal that does not stimulate both the I and Q paths, does not address the issue of imbalance between the two paths. An unbiased training sequence can be used to stimulate both the I and Q paths, which results in a better channel estimate. Conventionally, channel estimates are derived from predetermined information associated with the positive (+f) subcarriers. Even better channel estimates can be obtained if the negative (−f) subcarriers are used to derive an estimate of any residual quadrature imbalance.

Accordingly, a method is provided for removing quadrature imbalance errors in received data. The method accepts an unbiased training sequence in a quadrature demodulation receiver. An unbiased training sequence has a uniform accumulated power evenly distributed in a complex plane, and includes predetermined reference signals (p) at frequency +f and predetermined mirror signals ($p_m$) at frequency −f. The unbiased training sequence is processed, generating a sequence of processed symbols (y) at frequency +f, representing complex plane information in the unbiased training sequence. Each processed symbol (y) is multiplied by the mirror signal ($p_m$), and an unbiased quadrature imbalance estimate $B_m$ is obtained at frequency (−f).

For example, the unbiased training sequence may be accepted on a first subcarrier, and the quadrature imbalance estimate obtained for the first subcarrier. Then, the method accepts quadrature modulated communication data on the first subcarrier in symbol periods subsequent to accepting the unbiased training sequence. A processed symbol ($y_c$) is generated for each communication data symbol, and each processed symbol ($y_c$) is multiplied by a quadrature imbalance estimate to derive an imbalance-corrected symbol.

The method also multiplies the processed symbol (y) by a conjugate of the reference signal (p*) to obtain an unbiased channel estimate ($h_u$) at frequency +f. Using the quadrature imbalance and channel estimates, imbalance-corrected symbols can be derived.

Additional details of the above-described method, and a system for removing quadrature imbalance errors in received data are presented below.

DETAILED DESCRIPTION

Figure 1:
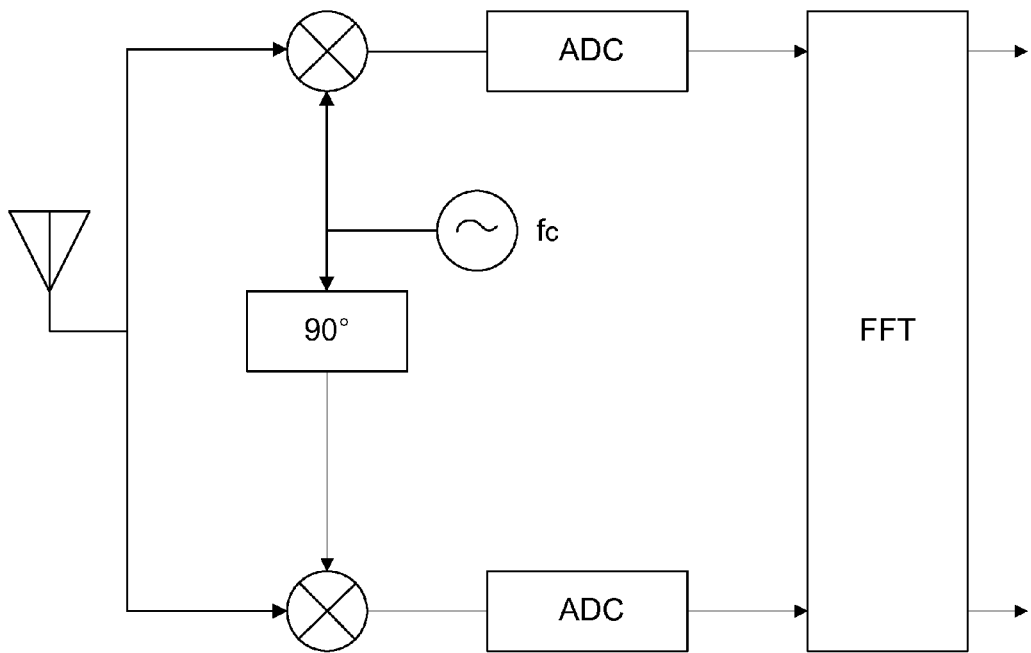
FIG. 1 is a schematic block diagram of a conventional receiver front end (prior art).
Figure 2:
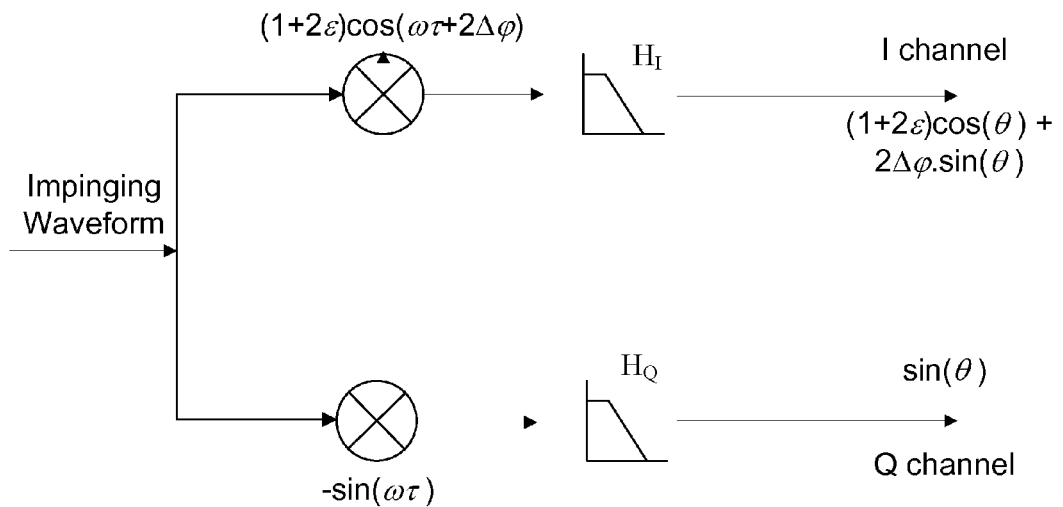
FIG. 2 is a schematic diagram illustrating quadrature imbalance at the receiver side (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
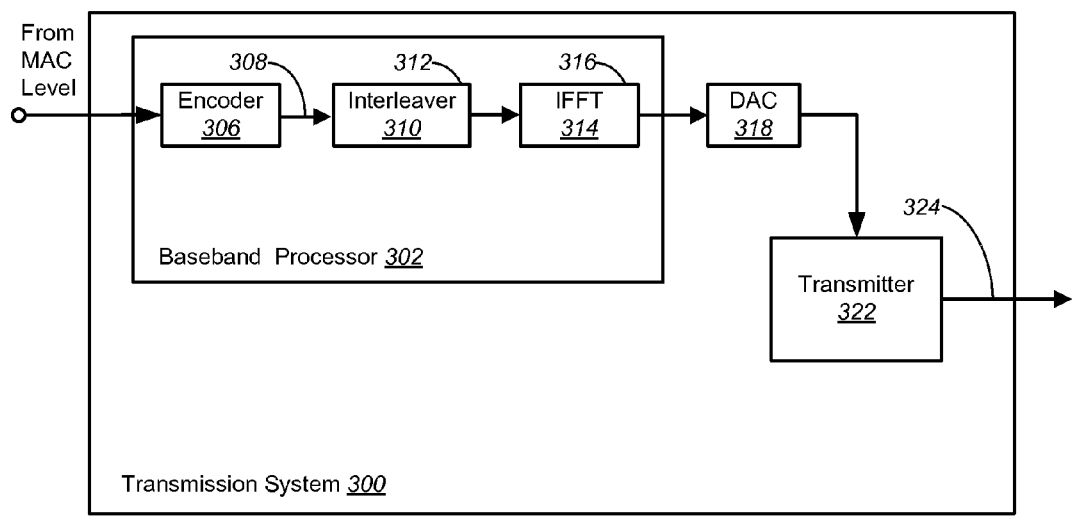
FIG. 3 is a schematic block diagram depicting an exemplary data transmission system.

FIG. 3 is a schematic block diagram depicting an exemplary data transmission system 300. A baseband processor 302 has an input on line 304 to accept digital information form the Media Access Control (MAC) level. In one aspect, the baseband processor 302 includes an encoder 306 having an input on line 304 to accept digital (MAC) information and an output on line 308 to supply encoded digital information in the frequency domain. An interleaver 310 may be used to interleave the encoded digital information, supplying interleaved information in the frequency domain on line 312. The interleaver 310 is a device that converts the single high speed input signal into a plurality of parallel lower rate streams, where each lower rate stream is associated with a particular subcarrier. An inverse fast Fourier transform (IFFT) 314 accepts information in the frequency domain, performs an IFFT operation on the input information, and supplies a digital time domain signal on line 316. A digital-to-analog converter 318 converts the digital signal on line 316 to an analog baseband signal on line 320. As described in more detail below, a transmitter 322 modulates the baseband signal, and supplies a modulated carrier signal as an output on line 324. Note: alternate circuitry configurations capable of performing the same functions as described above would be known by those with skill in the art. Although not explicitly shown, a receiver system would be composed of a similar set of components for reverse processing information accepted from a transmitter.

Figure 4:
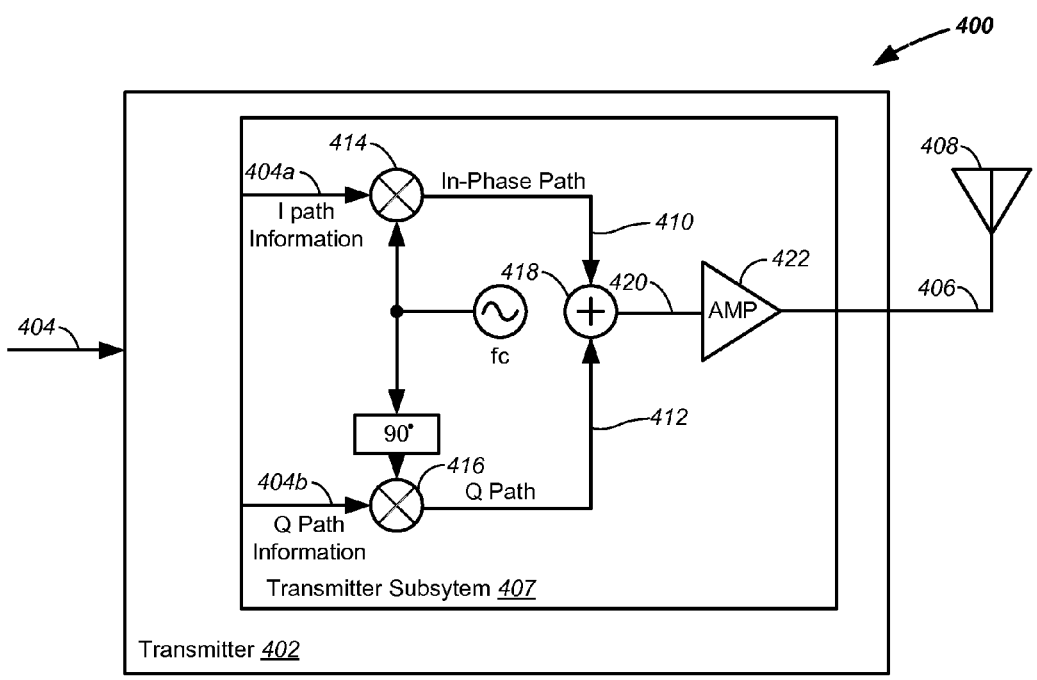
FIG. 4 is a schematic block diagram of a system or device for transmitting an unbiased communications training sequence.

FIG. 4 is a schematic block diagram of a system or device for transmitting an unbiased communications training sequence. The system 400 comprises a transmitter or transmission means 402 having an input on line 404 to accept digital information. For example, the information may be supplied from the MAC level. The transmitter 402 has an output on line 406 to supply a quadrature modulation unbiased training sequence representing a uniform accumulated a power evenly distributed in a complex plane.

The transmitter 402 may include a transmitter subsystem 407, such as a radio frequency (RF) transmitter subsystem that uses an antenna 408 to communicate via an air or vacuum media. However, it should be understood that the invention is applicable to any communication medium (e.g., wireless, wired, optical) capable of carrying quadrature modulated information. The transmitter subsystem 407 includes an in-phase (I) modulation path 410, or a means for generating I modulation training information in the time domain having an accumulated power. The transmitter subsystem 407 also includes a quadrature (Q) modulation path 412, or a means for generating Q modulation training information in the time domain having an accumulated power equal to the I modulation path power. I path information on line 404a is upconverted at mixer 414 with carrier fc, while Q path information on line 404b is upconverted at mixer 416 with a phase shifted version of the carrier (fc+90°). The I path 410 and Q path 412 are summed at combiner 418 and supplied on line 420. In some aspects, the signal is amplified at amplifier 422 and supplied to antenna 408 on line 406, where the unbiased training sequences are radiated. The I and Q paths may alternately be referred to as I and Q channels. A unbiased training sequence may also be referred to as a rotating training signal, a quadrature balanced training sequence, balanced training sequence, balanced training sequence, or unbiased training signal.

For example, the unbiased training sequence may be initially sent via the I modulation path 410, with training information subsequently sent via the Q modulation path 412. That is, the training signal may include information, such as a symbol or a repeated series of symbols sent only via the I modulation path, followed by the transmission of a symbol or repeated series of symbols sent only via the Q modulation path. Alternately, training information may be sent initially via the Q modulation path, and subsequently via the I modulation path. In the case of single symbols being sent alternately through the I and Q paths, the transmitter sends a rotating training signal. For example, the first symbol may always be (1,0), the second symbol may always be (0,1), the third symbol (−1,0), and the fourth symbol (0,−1).

However, it is not necessary to simply alternate the transmission of symbols through the I and Q modulations paths to obtain symbol rotation, as described above. For example, the transmitter may send training information simultaneously through both the I and Q modulation paths, and combine I and Q modulated signals.

The above-mentioned rotating type of unbiased training sequence, which initially sends training signal via (just) the I modulation path, may be accomplished by energizing the I modulation path, but not energizing the Q modulation path. Then, the transmitter sends a training signal via the Q modulation path by energizing the Q modulation path, subsequent to sending training information via the I modulation path. The training symbols can also be rotated by supplying symbols, each with both I and Q components, as is conventionally associated with quadrature modulation.

Typically, the transmitter 402 also sends quadrature modulated (non-predetermined) communication data. The unbiased training sequence is used by a receiver (not shown) to create unbiased channel estimates, which permit the non-predetermined communication data to be recovered more accurately. In one aspect, the quadrature modulated communication data is sent subsequent to sending the unbiased training sequence. In another aspect, the unbiased training sequence is sent concurrently with the communication data in the form of pilot signals. The system is not limited to any particular temporal relationship between the training signal and the quadrature modulated communication data.

To be unbiased, the symbol values associated with any particular subcarrier may periodically vary. The simplest means of evenly distributing information in the complex plane when there are an even number of symbols per message, is to rotate the symbol value 90 degrees every period. As used herein, a message is a grouping of symbols in a predetermined format. A message has a duration of several symbols periods. One or more symbols may be transmitted every symbol period. Some messages include a preamble preceding the main body of the message. For example, a message may be formed as a long packet containing many OFDM symbols. Each OFDM symbol contains many subcarriers. In some aspects, the message preamble includes the unbiased training sequence. In other aspects, the unbiased training sequence is a sequence of pilot signals that are transmitted simultaneously with the non-predetermined communication data.

If an uneven number of symbols are used in the training sequence of a message, a methodology that rotates the phase of the symbol by 90 degrees every period is not always useful. For a sequence of 3 symbols, a 60-degree or 120-degree rotation may be used to evenly distribute the symbol values in the complex plane. For 5 symbols, a 180/5-degree or 360/5-degree rotation may be used. If the number of symbols in a training sequence is a prime number, combination solutions can be used. For example, if there are a total of 7 symbols in a message, then a rotation of 90 degrees may be used for the first 4 symbols, and a rotation of 120 (or 60) degrees for the next three symbols. In another aspect, the unbiased training sequence may be averaged over more than one message. For example, if a message includes 3 training symbols, then the combination of 2 messages includes 6 symbols. In the context of a 6-symbol training signal, a rotation of 90 degrees may be used between symbols.

Since power is a measurement responsive to the squaring of a complex symbol value, the power associated with a symbol vector at angle θ in complex space may also be considered to be the power at (θ+180). Hence, the accumulated power at an angle of 60 degrees is the same as the power at 240 degrees. Alternately stated, the power associated with a symbol at angle θ may be summed with the power at angle (θ+180). By summing the power at angles θ and (θ+180), complex space, as considered from the perspective of power, only spans 180 degrees. For this reason, a uniform accumulation of power is evenly distributed in complex space when the unbiased training sequence consists of only 2 orthogonal symbols, or 3 symbols separated by 60 degrees.

Figure 5A:
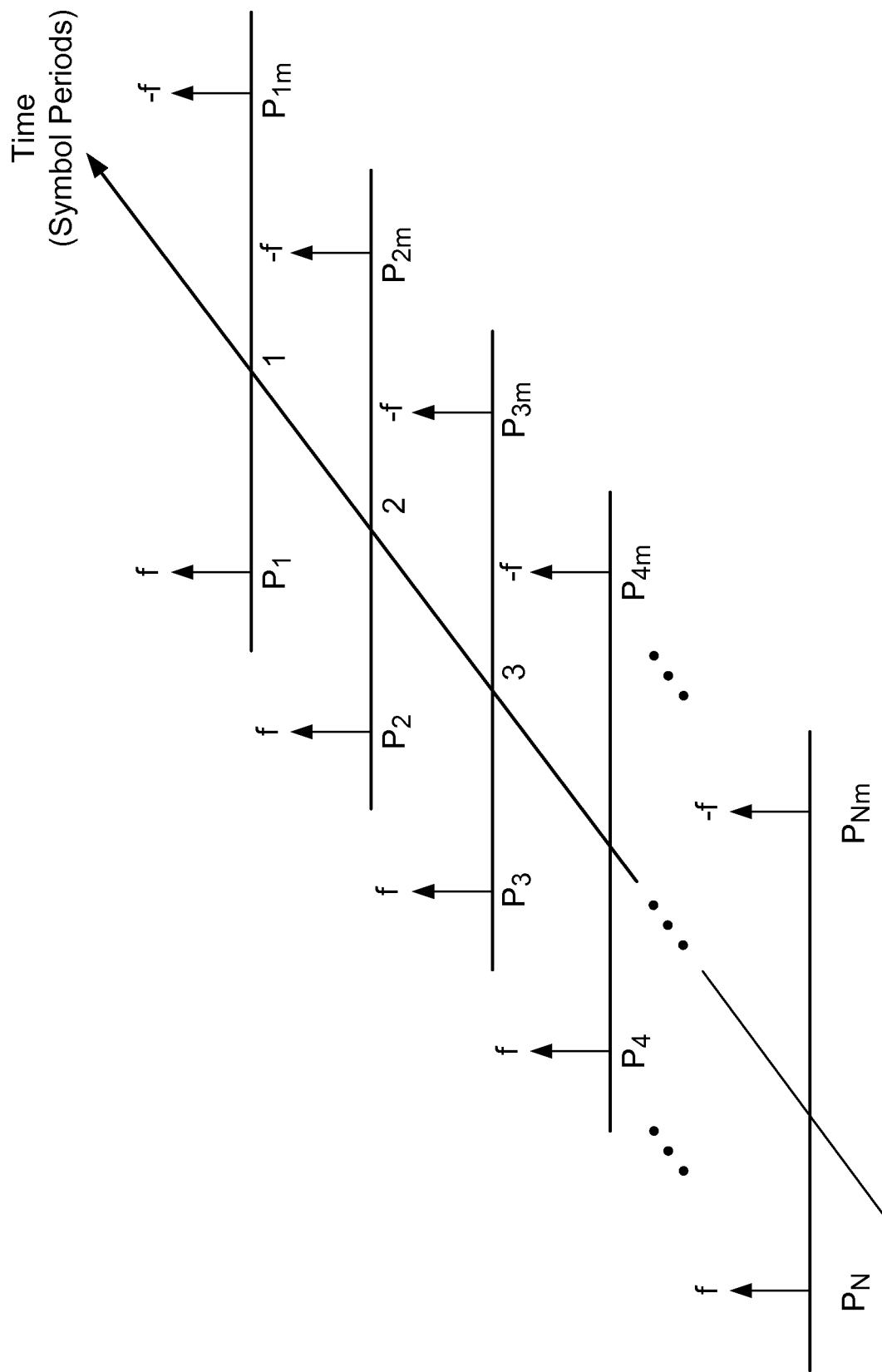
FIG. 5A is a diagram depicting an unbiased training sequence represented in both the time and frequency domains.

FIG. 5A is a diagram depicting an unbiased training sequence represented in both the time and frequency domains. In one aspect the transmitter generates a signal pair including a complex value reference signal (p) at frequency +f and a complex value mirror signal ($p_m$) at frequency −f, with a nullified product ($p \cdot p_m$). For example, at time i=1, the product ($p_1 \cdot p_{1m}$)=0. As noted above, p and $p_m$ are complex values with amplitude and phase components. In another aspect, the transmitter generates i occurrences of the reference signal (p) and mirror signal ($p_m$), and nullifies the sum of the products ($p_i \cdot p_{im}$). Alternately stated, the sum of ($p_i \cdot p_{im}$)=0, for i=1 to N. Note: the "dot" between the $p_i$ and $p_{im}$ symbols is intended to represent a conventional multiplication operation between scalar numbers.

Likewise, when the transmitter generates i occurrences of the reference signal and mirror signal, the signal pair values p and pm may, but need not, vary for every occurrence. For example, the transmitter may nullify the sum of the products ($p_i \cdot p_{im}$) by generating information as a complex value that remains constant for every occurrence, to represent p. To represent $p_m$, the transmitter may generate information as a complex value that rotates 180 degrees every occurrence. However, there are almost an infinite number of other ways that the products ($p_i \cdot p_{im}$) may be nulled.

In another aspect, the transmitter generates i occurrences of reference signal (p) and mirror signal ($p_m$), and a product ($p_i \cdot p_{im}$) for each occurrence. The transmitter pairs occurrences and nullifies the sum of the products from each paired occurrence.

For example, one or more messages may contain a temporal sequence of N pilot tones, for a given subcarrier f, with N pilot tones for the mirror subcarrier −f. As noted above in the discussion of FIG. 5A, to create an unbiased training sequence using this pilot tone, the general solution is the sum of ($p_i \cdot p_{im}$)=0, for i=1 to N. For one particular solution, the pilot tones are paired for i=1 and 2. Thus, $p_1 \cdot p_{1m} + p_2 \cdot p_{2m} = 0$. Likewise, the pilot tones for i=3 and 4 may be paired as follows: $p_3 \cdot p_{3m} + p_4 \cdot p_{4m} = 0$. This pairing may be continued out to i=N. If each pair has a sum of zero, then the total sum is also zero, i.e., sum $p_i \cdot p_{im}$=0. Pairing simplifies the nulling issue. Instead of searching for N pilots that verify sum $p_i \cdot p_{im}$=0, it is enough that 2 pair of pilots can be nulled.

As described above, simple examples of creating an unbiased training sequence include either the rotation of symbols by 90 degrees in the time domain, or in the frequency domain, maintaining the symbol reference on +f, but flipping the sign the mirror on −f. Both these examples used 2 pair of tones and satisfy the equation $p_1 \cdot p_{1m} + p_2 \cdot p_{2m} = 0$.

Alternately expressed, the unbiased training sequence may include:
Time 1: $p_1$ for +f and $p_{1m}$ for −f;
Time 2: $p_2$ for +f and $p_{2m}$ for −f;
Time 3: $p_3$ for +f and $p_{3m}$ for −f; and,
Time 4: $p_4$ for +f and $p_{4m}$ for −f.

The unbiased training sequence can be obtained by averaging. The principle of unbiased training sequence dictates that the pilot must satisfy:

$$p_1 \cdot p_{1m} + p_2 \cdot p_{2m} + p_3 \cdot p_{3m} + p_4 \cdot p_{4m} = 0$$

As a variation, the unbiased training sequence can be organized as follows:

$$p_1 \cdot p_{1m} + p_2 \cdot p_{2m} = 0 \text{ and } p_3 \cdot p_{3m} + p_4 \cdot p_{4m} = 0$$

Figure 5B:
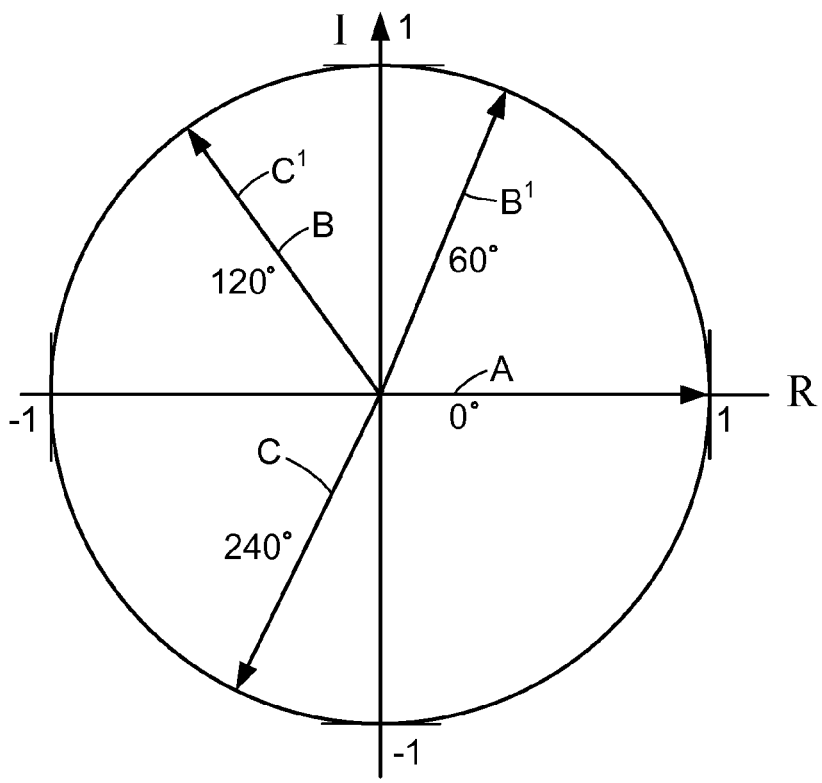
FIGS. 5B and 5C are diagrams depicting the uniform accumulation of power evenly distributed in a complex plane.
Figure 5C:
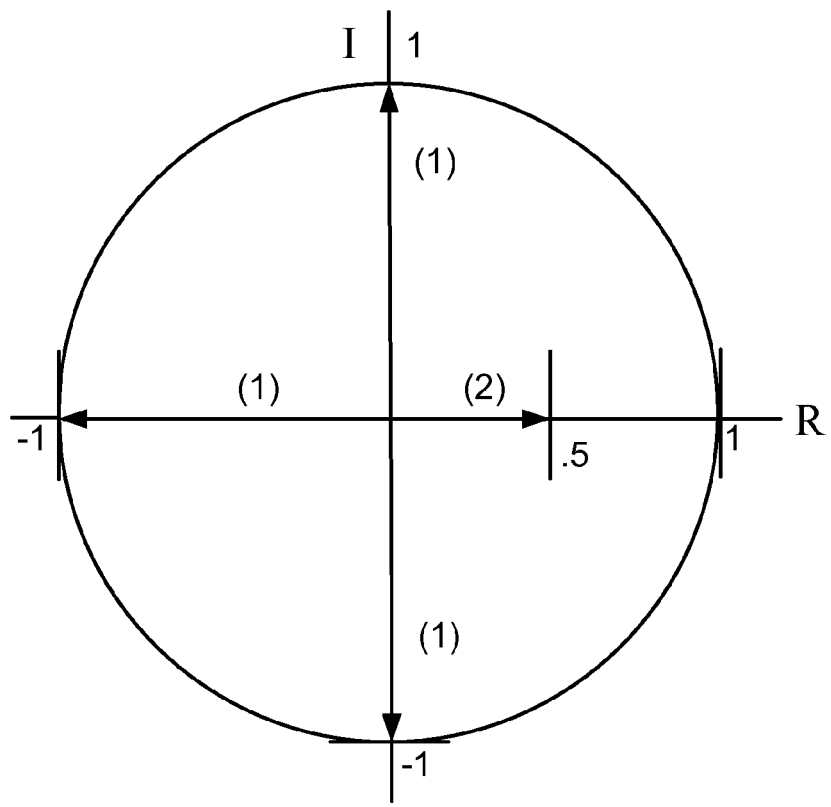

FIGS. 5B and 5C are diagrams depicting the uniform accumulation of power evenly distributed in a complex plane. The complex plane can be used to represent real axis (R) and imaginary axis (I) information. The circle represents the boundary of uniform power or energy with a normalized value of 1. In FIG. 5B, the unbiased training sequence is formed from 3 symbols: a first symbol (A) at 0 degrees; a second symbol (B) at 120 degrees; and a third symbol (C) at 240 degrees. The exact same power distribution is obtained when the first symbol (A) remains at 0 degrees, the second symbol (B') is at 60 degrees, and the third symbol (C') is at 120 degrees. The power associated with each symbol is 1.

In FIG. 5C, the unbiased training sequence is formed from 5 symbols: 2 symbols at 0 degrees, each with a power of 0.5, so that the accumulated power is 1; a symbol at 90 degrees with a power of 1; a symbol at 180 degrees with a power of 1; and a symbol at 270 degrees with a power of 1.

As used herein, the above-mentioned "uniform accumulation of power" may be exactly equal accumulations in each complex plane direction, as in many circumstances it is possible to transmit and receive an unbiased training sequence with an error of zero. That is, the training sequence is 100% biased. Alternately stated, the sum of $p_i \cdot p_{im}$=0, as described above. In a worst case analysis, L pilot symbols are averaged, each having a uniform accumulated power as follows:

$$|\text{sum } p_i \cdot p_{im}| = \text{sum}|pi|^2 = L$$

If L is 100%, and if a |sum $p_i \cdot p_{im}$|=L/4, then the (uniform accumulated power) error is 25%. An unbiased training sequence with a 25% error still yields excellent results. If L/2 is used (a 50% error), good results are obtained as the IQ interference from the channel estimate still decreases by 6 dB.

Figure 6:
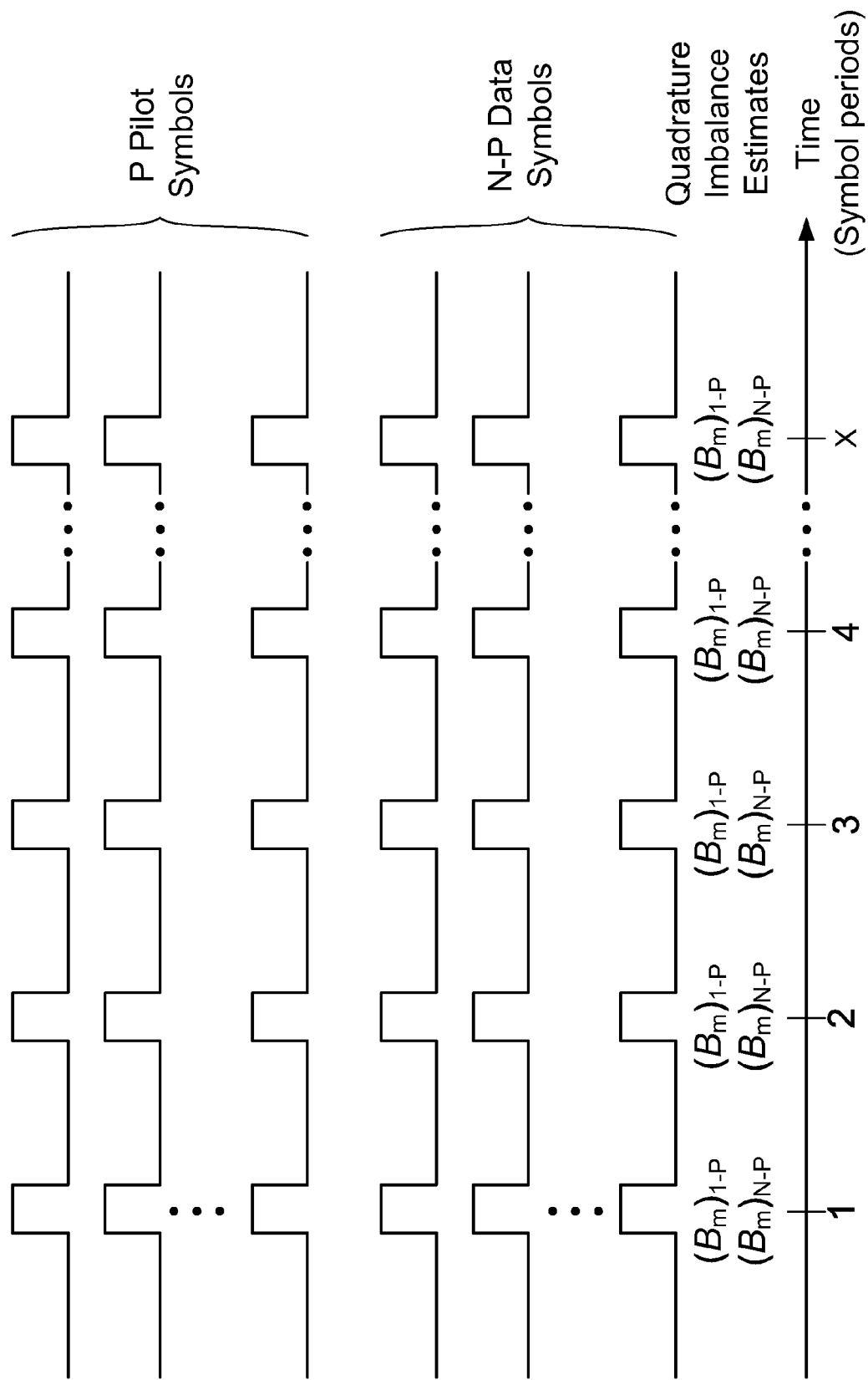
FIG. 6 is a diagram depicting an unbiased training sequence enabled as a sequence of pilot tones in the time domain.

FIG. 6 is a diagram depicting an unbiased training sequence enabled as a sequence of pilot tones in the time domain. The transmitter may generate the unbiased training sequence by supplying P pilot symbols per symbol period, in a plurality of symbol periods. Each pulse in the figure represents a symbol. The transmitter generates (N−P) quadrature modulated communication data symbols per symbol period, and simultaneously supplies N symbols per symbol period, in the plurality of symbol periods. Many communications systems, such as those compliant with IEEE 802.11 and UWB use pilot tones for channel training purposes.

Figure 7:
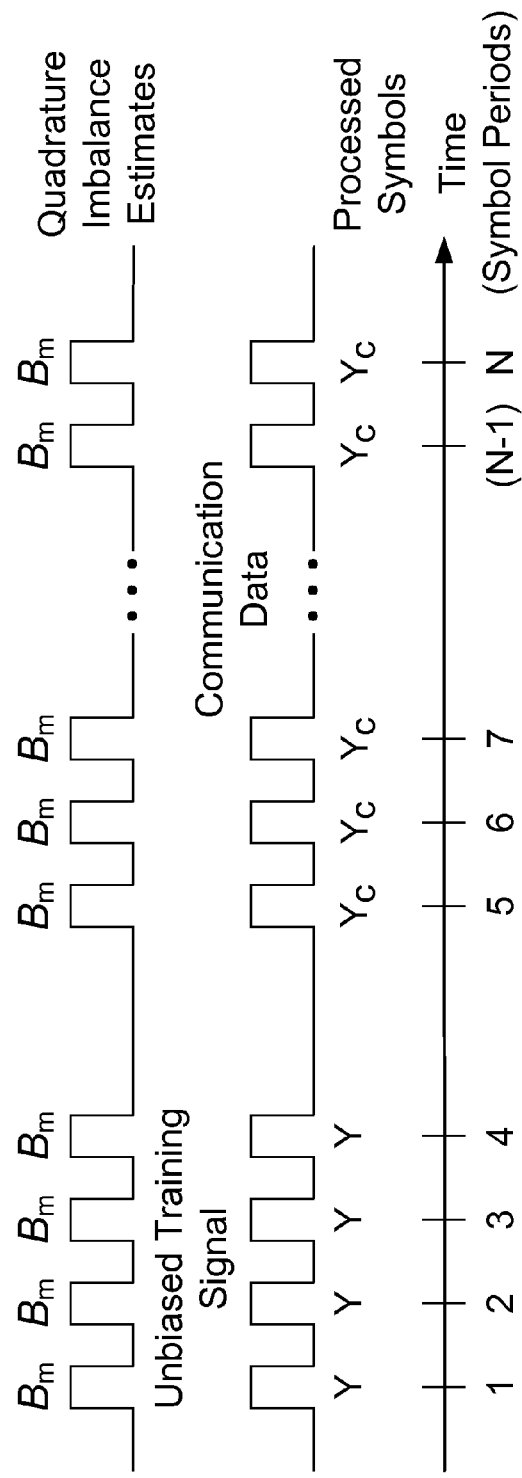
FIG. 7 is a diagram depicting an unbiased training sequence enabled as a preamble preceding non-predetermined communication data.

FIG. 7 is a diagram depicting an unbiased training sequence enabled as a preamble preceding non-predetermined communication data. The transmitter generates quadrature modulated communication data and supplies the unbiased training sequence in a first plurality of symbol periods (e.g., at times 1-4), followed by the quadrature modulated communication data in a second plurality of symbol periods (e.g., at times 5 through N). Again, the pulses in the figure represent symbols.

For example, an Ultra Wideband (UWB) system uses 6 symbols transmitted prior to the transmission of communication data or a beacon signal. Therefore, 3 consecutive symbols may be generated on the I modulation path followed by 3 consecutive on the Q modulation path. Using this process, the Q channel need only be activated briefly, for 3 symbols, before returning to sleep. However, there are many other combinations of symbols that may be used to generate an unbiased training sequence.

Viewing either FIG. 5B or 5C, it can be seen that the transmitter generates a temporal sequence of complex plane symbols with equal accumulated power in a plurality of directions (in the complex plane). As used herein, "direction" refers to the summation of vectors at each angle θ and (θ+180). For example, the power associated with a symbol at 0 degrees is accumulated with the power from a symbol at 180 degrees, as 0 and 180 degrees are the same direction. As a consequence of this relationship, the temporal sequence of symbols in the unbiased training sequence have a cumulative power associated with real axis information in the time domain, and an equal cumulative power associated with imaginary axis information in the time domain, as supplied in a plurality of symbols periods by the transmitter. In another aspect, the unbiased training sequence representing the uniform accumulated power evenly distributed in the complex plane may be expressed as a temporal sequence of i complex symbols (a) in the time domain, as follows:

$$\text{sum } a_i(k) \cdot a_i(k) = 0$$

where k is a number of samples per symbol period. Note: the "dot" between the $a_i$ and $a_i$ symbols is intended to represent a conventional multiplication operation between scalar numbers.

Since the symbol $a_i$ is typically a subcarrier with a periodic waveform, there is no one particular value for a. That is, $a_i$ varies with time, and could be represented as $a_i(t)$. However, if t samples are obtained, the symbol may be expressed as $a_i(kT)$, or $a_i(k)$, assuming T is normalized to 1. For time domain systems, the summation over k disappears. With only one sample per symbol, the symbol and sample become the same and the equation can be written as:

$$\text{sum } a_i \cdot a_i = 0$$

To illustrate with a simple 2-symbol orthogonal unbiased training sequence, if the first symbol (i=1) has an angle of 0 degree, an equal amount of power must exist at an angle of 180 degrees in order to satisfy the equation. Likewise, if the second symbol is at 90 degrees, and equal amount of power must exist at an angle of 270 degrees. Other more complication examples may require that the symbols be summed over the index of i to obtain the nulled final result.

Alternately considered, the formula sum $a_i \cdot a_i = 0$ refers to the fact that if a projection is made in any direction in the complex plane and the power calculated, the power is always the same, regardless of the angle. The power in direction φ is:

$$\text{sum} |Re\ a_i(-j\phi)|^2 = 0.5\ \text{sum} |a_i|^2 + 0.5\ Re(-2j\phi \text{sum } a_i \cdot a_i = 0$$

This power is constant for all φ if and only if sum $a_i \cdot a_i = 0$.

It can be shown that the frequency domain formula (sum $p_i \cdot p_{im} = 0$) is equivalent to sum $a_i \cdot a_i = 0$. The time domain signal corresponding to $p_i$ and $p_{im}$ is:

$$a_i = p_i \exp(j2\pi ft) + p_{im} \exp(-j2\pi ft)$$

since $p_i$ modulates +f and $p_{im}$ modulates −f.

Within one symbol i, the integral over time of $a_i \cdot a_i$ is:

$$\text{integral } a_i \cdot a_i = \text{integral } \{p_i \cdot p_i \exp(j4\pi ft) + p_{im} \cdot p_{im} \exp(-j4\pi ft) + p_i \cdot p_{im}\} = p_i \cdot p_{im}$$

since the $\exp(j4\pi ft)$ rotates several times and vanishes when integrated in one symbol.

So $a_i \cdot a_i$ cumulated in one symbol is equal to $p_i \cdot p_{im}$.

If all the symbols are added up:

$$\text{sum integral } a_i \cdot a_i = \text{sum } p_i \cdot p_{im} = 0$$

Figure 8:
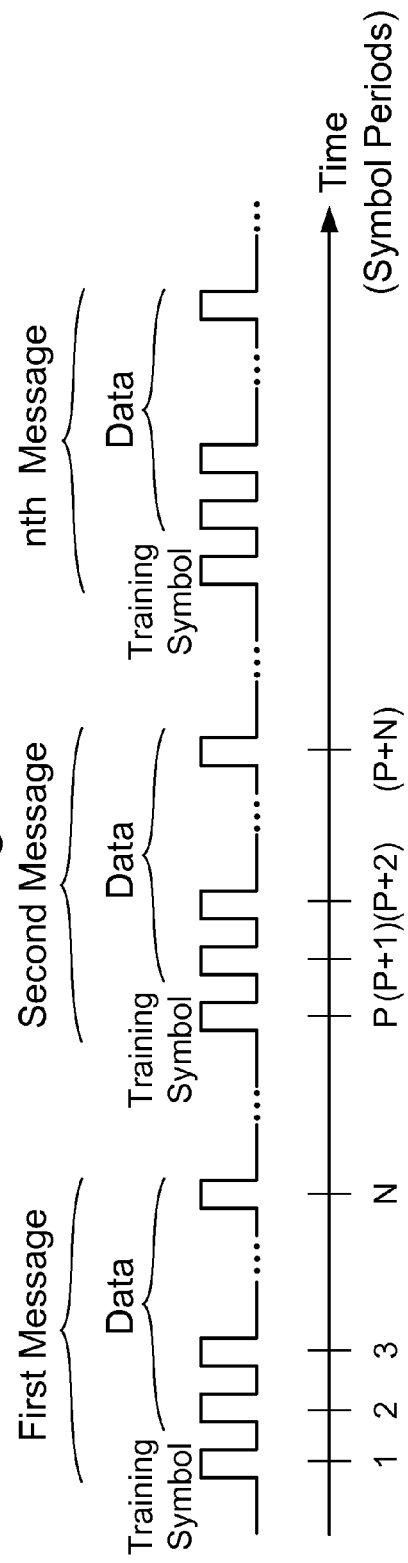
FIG. 8 is a diagram depicting an unbiased training sequence enabled by averaging symbols over a plurality of messages.

FIG. 8 is a diagram depicting an unbiased training sequence enabled by averaging symbols over a plurality of messages. A symbol (or more than one, not shown) is generated in a first symbol period in a first message. A symbol is generated in a second symbol period in a second message, subsequent to the first message. More generally, a training information symbols are generated in a plurality (n) messages. The transmitter generates the unbiased training sequence by creating equal power in a plurality of complex plane directions, as accumulated over the plurality of messages. Although a preamble type training sequence is shown, similar to FIG. 7, the same type of analysis can be applied to pilot-type unbiased training sequence.

Figure 9:
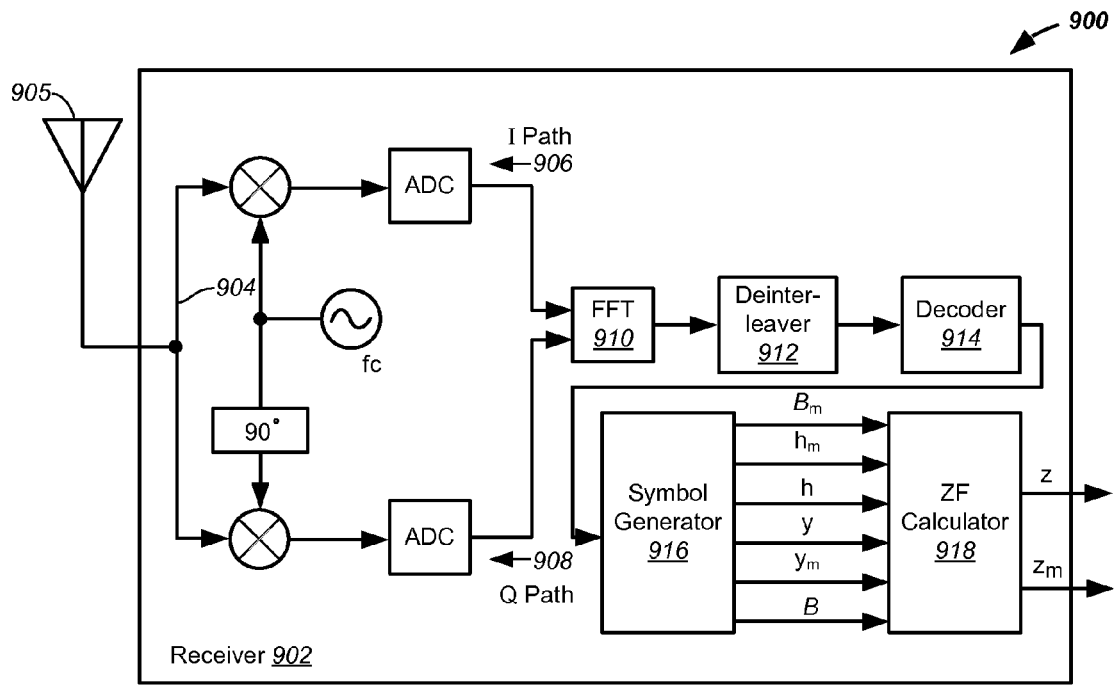
FIG. 9 is a schematic block diagram of a system for removing quadrature imbalance errors in received data.

FIG. 9 is a schematic block diagram of a system for removing quadrature imbalance errors in received data. The system or device 900 comprises a quadrature demodulation receiver or receiving means 902 having an input on line 904 to accept an unbiased training sequence. As with the transmitter of FIG. 4, the receiver 902 may be an RF device connected to an antenna 905 to receive radiated information. However, the receiver may alternately receive the unbiased training sequence via a wired or optical medium (not shown).

The receiver 902 has an in-phase (I) demodulation path 906 for accepting I demodulation training information in the time domain having an accumulated power. A quadrature (Q) demodulation path 908 accepts Q demodulation training information in the time domain. When considering the unbiased training sequence, the Q path has an accumulated power equal to the I modulation path power. As is conventional, the receiver 902 includes analog- to digital converters (ADC) 909, a fast Fourier transformer (FFT) 910, a deinterleaver 912, and a decoder 914.

The quadrature demodulation receiver 902 accepts an unbiased training sequence of predetermined reference signals (p) at frequency (+f) and predetermined mirror signals ($p_m$) at frequency (−f) with a uniform accumulated power evenly distributed in a complex plane. The receiver 902 generates a sequence of processed symbols (y) at frequency (+f) representing complex plane information in the unbiased training sequence, multiplies each processed symbols (y) by the mirror signal (pm), and supplies a quadrature imbalance estimate ($B_m$) at frequency (−f). For simplicity, it is shown that the generation of the processed symbols and the multiplication by the mirror symbols is performed in symbol generator 916.

As noted above in the discussion of the transmitter, the unbiased training sequence is a temporal sequence of complex plane symbols with equal accumulated power in a plurality of directions. Alternately considered, the receiver accepts the unbiased training sequence as a signal pair including a complex value reference signal (p) at frequency +f and a complex value mirror signal ($p_m$) at frequency −f, where the product ($p \cdot p_m$) is null. For example, the receiver accepts the unbiased training sequence as i occurrences of the reference signal (p) and the mirror signal ($p_m$), where the sum of the products ($p_i \cdot p_{im}$) is null.

In some aspects, the receiver 902 accepts an unbiased training sequence with a plurality of simultaneously accepted predetermined reference signals ($p_n$) and a plurality of simultaneously accepted predetermined mirror signals ($p_{nm}$). For example, n pilot symbols may be accepted every symbol period. The receiver 902 generates a plurality of processed symbols ($y_n$) from the corresponding plurality of reference signals, multiplies each processed symbol by its corresponding mirror signal, and obtains a plurality of channel estimates ($B_{nm}$) from the corresponding plurality of ($y_n$)($p_{nm}$) products.

More explicitly (see FIG. 6), the receiver accepts the unbiased training sequence as P pilot symbols per symbol period, in a plurality of symbol periods, and obtains P unbiased pilot channel estimates. Simultaneously, the receiver accepts (N–P) quadrature modulated communication data symbols in each symbol period and generates a processed symbol ($y_c$) for communication data in each symbol period (depicted as $Y_{N-P}$). Channels estimates are extrapolated for each processed symbol ($y_c$), and quadrature imbalance estimates $B_m$ (depicted as ($B_m)_{N-P}$) are derived for each processed symbol ($y_c$) from the pilot channel quadrature imbalance estimates (depicted as ($B_m)_{1-P}$).

In another aspect, the receiver accepts an unbiased training sequence with temporal sequence of n predetermined reference signals ($p_n$) and n predetermined mirror signals ($p_{nm}$), see FIG. 5A. The receiver generates a temporal sequence of n processed symbols ($y_n$) from the temporal sequence of reference signals, and multiplies each processed symbol in the temporal sequence by its corresponding mirror signal. A temporal sequence of n quadrature imbalance estimates ($B_{nm}$) is obtained and the n quadrature imbalance estimates are averaged.

More explicitly as shown in FIG. 7, the receiver may accept the unbiased training sequence on a first subcarrier and the receiver derives a quadrature imbalances estimate ($B_m$) for the first subcarrier. The receiver accepts quadrature modulated communication data on the first subcarrier in symbol periods subsequent to accepting the unbiased training sequence, generating a processed symbol ($y_c$) for each communication data symbol. A quadrature imbalance estimate ($B_m$) is derived from each processed symbol.

Returning to FIG. 9, the receiver (i.e., symbol generator 916) multiplies the processed symbol (y) by a conjugate of the reference signal (p*), obtains an unbiased channel estimate ($h_u$) at frequency +f. Further, the unbiased training sequence is processed to generate a sequence of processed symbols ($y_m$) at frequency –f. The receiver multiplies symbol ($y_m$) by ($p_m$*) to obtain channel estimate $h_m$, at frequency –f, and multiplies symbol $y_m$ by p* to obtain quadrature imbalance estimate B at frequency +f.

The receiver calculates an imbalance-corrected symbol (z)=y–($B_m/h_m$*)$y_m$*, if the signal-to-noise ratio (SNR) of ($x_m$) is greater than j, and otherwise sets (z) equal to (y). For simplicity, zero-forcing (ZF) calculator 918 is shown supplying the imbalance-corrected symbols in response to receiving processed symbols, channel estimates, and quadrature imbalance estimates. The receiver (i.e., ZF calculator 918) calculates ($z_m$)=$y_m$–(B/h*)y*, if the SNR of (x) is greater than j, and otherwise, sets ($z_m$) equal to ($y_m$). The receiver uses (z) and ($z_m$) in the calculation of (x) and ($x_m$), respectively, which is outside the scope of this disclosure. In one aspect, as explained in greater detail below, the receiver calculates ($z_m$) and (z) using the quadrature imbalance estimates (B) and ($B_m$), respectively, if the SNR is greater than 1 (j=1).

Although not specifically shown, the receiver of FIG. 9 may also be enabled as a processing device for removing quadrature imbalance errors in received data. Such a processing device comprises a quadrature demodulation receiving module having an input to accept an unbiased training sequence of predetermined reference signals (p) at frequency (+f) and predetermined mirror signals ($p_m$) at frequency (–f) with a uniform accumulated power evenly distributed in a complex plane. The receiving module generates a sequence of processed symbols (y) at frequency (+f) representing complex plane information in the unbiased training sequence, multiplies each processed symbols (y) by the mirror signal (pm), and supplies a quadrature imbalance estimate ($B_m$) at frequency (–f).

Training sequences, whether enabled in a preamble or as pilot signals are similar in that the information content of transmitted data is typically predetermined or "known" data that permits the receiver to calibrate and make channel measurements. When receiving communication (non-predetermined) data, there are 3 unknowns: the data itself, the channel, and noise. The receiver is unable to calibrate for noise, since noise changes randomly. Channel is a measurement commonly associated with delay and multipath. For relatively short periods of time, the errors resulting from multipath can be measured if predetermined data is used, such as training or pilot signals. Once the channel is known, this measurement can be used to remove errors in received communication (non-predetermined) data. Therefore, some systems supply a training signal to measure a channel before data decoding begins.

However, the channel can change, for example, as either the transmitter or receiver moves in space, or the clocks drift. Hence, many systems continue to send more "known" data along with the "unknown" data in order to track the slow changes in the channel.

Although not specifically shown, the transmitter of FIG. 4 and the receiver of FIG. 9 may be combined to form a transceiver. In fact, the transmitter and receiver of such a transceiver may share elements such as an antenna, baseband processor, and MAC level circuitry. The explanations made above are intended to describe a transceiver that both transmits unbiased training sequences and calculates unbiased channel estimates based upon the receipt of unbiased training sequences from other transceivers in a network of devices.

Functional Description

Modern high data rate communication systems transmit signals on two distinct channels, the in-phase and quadrature-phase channels (I and Q). The two channels form a 2D constellation in a complex plane. QPSK and QAM are examples of constellations. The I and Q channels may be carried by RF hardware that cannot be perfectly balanced due to variations in RF components, which results in IQ imbalance. In the increasingly common direct conversion systems, the imbalance issued are even greater. IQ imbalance distorts the constellation and results in crosstalk between the I and Q channels: the signal interferes with itself. Increasing transmission power does not help, since self-generated interference increases with the signal power. The signal-to-noise ratio (SINR) reaches an upper bound that puts a limit on the highest data rate attainable with a given RF hardware. In order to increase the data rate, a costly solution is to use fancier, more expensive hardware. A possibly less costly solution is to digitally estimate IQ imbalance and compensate for it. The concepts of digital estimation and compensation algorithms have been previously advanced in the art. However, the solutions tend to be expensive because they do not rely on a special type of training sequence. These solutions often only consider imbalance at one side, usually at the receiver.

Examples are given below that focus on Orthogonal Frequency Division Multiplexing (OFDM), with insights for time domain systems, which study end-to-end imbalance, from transmitter to receiver. Moreover, in OFDM the imbalance is modeled as a function of frequency, taking into account variations in the frequency response of the filters.

Two kinds of enhancements are presented: one with zero cost that eliminates the interference from the channel estimate by using an unbiased training sequence. Substantial gains are achieved because the error of the channel estimate is often more detrimental to performance than the error in the data itself. A second, relatively low cost, enhancement compensates for data distortion, if more gain is needed.

A model of the IQ imbalance is provided below. Analysis is provided to show how conventional channel estimation using unbiased training sequences can mitigate part of the IQ imbalance. Then, a straightforward extension is provided to calculate the IQ imbalance parameters, proving that the algorithms are effective. Using the estimated parameters, a simple compensation algorithm is presented to mitigate data distortion. Simulation results for WiMedia's UWB are also given, as well as suggestions to amend the standard.

IQ Imbalance Model

IQ imbalance arises when the power (amplitude) balance or the orthogonality (phase) between the in-phase (I) and quadrature-phase (Q) channels is not maintained. IQ imbalance is therefore characterized by an amplitude imbalance $2\epsilon$ and a phase imbalance $2\Delta\phi$.

Time Domain Signals

A complex symbol x is transmitted and received via the I and Q channels. In an ideal noiseless channel, the symbol x is received intact. But in the presence of IQ imbalance, a noisy or distorted version is likely received.

$$y = \alpha x + \beta x^* \qquad (1)$$

where $$\alpha = \cos(\Delta\phi) + j\epsilon \sin(\Delta\phi)$$

$$\beta = \epsilon \cos(\Delta\phi) - j \sin(\Delta\phi) \qquad (2)$$

are complex quantities modeling the imbalance, $\alpha \approx 1$ and $\beta \approx 0$. Nonlinear model (1) is linearized via the vector form $$\begin{pmatrix} y \\ y^* \end{pmatrix} = \begin{pmatrix} \alpha & \beta \\ \beta^* & \alpha^* \end{pmatrix} \begin{pmatrix} x \\ x^* \end{pmatrix} \qquad (3)$$

$$\to Y = BX.$$

B is the imbalance matrix. The second row is obsolete since it is a duplicate version of the first row. But it gives a same size and type input and output so imbalance blocks at transmitter and receiver can be concatenated, as described below. The imbalance matrix at the transmitter is defined by $B_t$, and at the receiver it is defined by $B_r$.

One-Tap Channel

A one-tap channel is considered, suitable for OFDM. A one-tap channel h in appropriate matrix form is $$H = \begin{pmatrix} h & 0 \\ 0 & h^* \end{pmatrix} \qquad (4)$$

With imbalance at transmitter and receiver, and in average while Gaussian (AWGN) noise n, vector form $N=(n n^*)T$, the received signal is expressed as a concatenation of linear blocks $$Y = B_r H B_t X + N \qquad (5)$$

$$\stackrel{\Delta}{=} H'X + N$$

$$\stackrel{\Delta}{=} \begin{pmatrix} h' & \beta' \\ \beta'^* & h'^* \end{pmatrix} \begin{pmatrix} x \\ x^* \end{pmatrix} + \begin{pmatrix} n \\ n^* \end{pmatrix}$$

$$\to y = h'x + \beta'x^* + n.$$

The overall result is that IQ imbalance and channel combine to create a global channel h', plus an undesired distortion or interference characterized by a global imbalance parameter $\beta'$. The global imbalance parameter $\beta'$ changes when the channel changes, and may need to be estimated regularly.

Next, the condition is considered where the symbol x, rather than spanning the entire complex plane, is restricted to a given (1D) axis. For example, the axis may be associated with BPSK modulation, the real axis, the imaginary axis, or any axis in between. In this case, $x^* = kx$ may be written, where k is a complex constant (a rotation), and $$y = (h' + \beta' k)x + n \qquad (6)$$

$$\stackrel{\Delta}{=} h''x + n.$$

If x is restricted to a unique axis, IQ imbalance vanishes, becoming an integral part of an overall channel response.

Frequency Domain Signals

While the previous model applies to time domain signals, a modification is now considered where the signal of interest x is given in frequency domain, at frequency f. In time domain, this signal is carried by a complex tone, $xe^{j2\pi ft}$. Replacing terms in equation (1), the following is obtained $$\alpha x e^{j2\pi ft} + \beta x^* e^{-j2\pi ft} \qquad (7)$$

In OFDM, the interference created by IQ imbalance does not show up at the same frequency f, but rather at the mirror frequency −f, and vice versa. What is transmitted at −f creates interference on frequency +f. If signal $x_m$ is the signal transmitted at frequency −f, where index m denotes a quantity at mirror frequency −f, then at frequency −f the following is obtained $$\alpha_m x_m e^{-j2\pi ft} + \beta_m x_m^* e^{j2\pi ft} \qquad (8)$$

A generalization of the time domain equations has been used. The IQ imbalance parameters $\alpha$ and $\beta$ are here a function of frequency. This models an imbalance due to different low-pass (base-band) or band-pass (IF) filters in the system. The I and Q paths cannot have the exact same filters and, hence, the imbalance varies with frequency. In time domain systems, this kind of imbalance exists but it is very expensive to compensate. An equalizer and an extension of the model to deal with different convolutions on different channels are required. So in the time domain, bulk or average imbalance is used. Frequency domain systems are able to take advantage of the plain equalizer structure and model the imbalance on a per frequency basis.

If the output of equations (7) and (8) are combined per subcarrier, the following is observed $$Y = (\alpha x + \beta_m x_m^*)e^{j2\pi ft}$$

$$y_m = (\alpha_m x_m + \beta x^*)e^{-j2\pi ft} \qquad (9)$$

Omitting the subcarriers (automatically handled by the FFT), a linear model function of signals at +f and −f can be written as $$\begin{pmatrix} y \\ y_m^* \end{pmatrix} = \begin{pmatrix} a & \beta_m \\ \beta^* & a_m^* \end{pmatrix} \begin{pmatrix} x \\ x_m^* \end{pmatrix} \quad (10)$$

$$\rightarrow Y = BX$$

In the frequency domain model, the second row is no longer obsolete. The model deals, in one shot, with a pair of mirror frequencies. A one-tap channel h at frequency f, and $h_m$ at frequency −f is modeled by the matrix $$H = \begin{pmatrix} h & 0 \\ 0 & h_m^* \end{pmatrix}. \quad (11)$$

AWGN noise n at frequency f, and $n_m$ at frequency −f form the noise vector $N=(\eta \eta'_m)^T$. The end to end model is $$Y = B_r H B_t X + N \quad (12)$$
$$\stackrel{\Delta}{=} H'X + N$$
$$\stackrel{\Delta}{=} \begin{pmatrix} h' & \beta'_m \\ \beta'^* & h'^* \end{pmatrix} \begin{pmatrix} x \\ x_m^* \end{pmatrix} + \begin{pmatrix} n \\ n_m^* \end{pmatrix}$$
$$\rightarrow y = h'x + \beta'_m x_m^* + n$$
$$y_m = h'_m x_m + \beta' x^* + n_m$$

h', $h_m$' are the global channel taps, and β', $\beta_m$' are the global imbalance parameters. The imbalance parameters change when the channels change and may need to be estimated regularly.

Since IQ imbalance generates interference exclusively from the mirror frequency, two interesting cases are noteworthy. If at the mirror frequency no signal is transmitted, or the channel is in a fade, no interference is created. If on the other hand, the signal or channel is strong, the interference can be strong. Hence, in OFDM, the effect of IQ imbalance is more problematic.

Conventional Channel Estimation

Before examining the compensation algorithms, it is shown how half of the problem can be solved at no cost, simply by using an unbiased training sequence. An unbiased training sequence fully eliminates the interference from the channel estimate, noticeably improving performance. In fact, the error in the channel estimate is often more detrimental than the error in the data, because the channel estimate tends to create a bias in the constellation.

The model (12) is stimulated with pilot tones. At frequency +f, the pilot p is transmitted, and at frequency −f, the pilot $p_m$. Assuming, without loss of generality, that the pilots have a unit norm (the channel carries the effective power), the conventional channel estimate at frequency f is obtained by de-rotating by p*

$$\hat{h} = h'pp^* + \beta'_m p_m^* p^* + n \quad (13)$$
$$= h' + \beta'_m p_m^* p^* + n$$

By averaging several channel observations, the noise is automatically reduced (for clarity, noise de-rotation is omitted). With regard to the term $\beta'_m p_m^* p^*$, many OFDM systems (e.g., WiMedia's UWB) use a training sequence that is simply a repeated symbol. Therefore, this term does not decay with averaging. Applying a scrambling of +1 or −1 to the entire OFDM symbol does not help, as nothing changes when the sign of both p* and $p_m$* are inverted. Rather, the following is accomplished: after cumulating a number of observations, the sum of the products is nullified $$\Sigma_i p_i p_{im} = 0 \quad (14)$$

Often the training sequence consists of an even number of symbols, and it is enough to ensure each pair adds up to zero $$p_1 p_{1m} + p_2 p_{2m} = 0 \quad (15)$$

TABLE 1

Examples of unbiased training sequences

| | |
|---|---|
| $P_2 = jp_1$ | Second training symbol is a 90 degrees rotation of first training symbol. |
| $P_2 = p_1, p_{2m} = -p_{1m}$ | For positive frequencies maintain fixed pilot, for negative frequencies constantly invert the sign. |

Examples of simple sequences that satisfy the condition are given in Table 1. These types of training sequences are denoted as unbiased training sequences because, on one hand, unbiased channel estimates are produced, and on the other, the training signals equally spans the I and Q dimensions of the complex plane in time domain. For example, an unbiased training sequence is not concentrated along just the real axis.

As a proof: consider the unit norm complex scalar $a_i = p_i e^{j\theta} = p_{im} e^{-j\theta}$, halfway between $p_i$ and $p_{im}$. In time domain, the pilots add up to $2a_i \cos(2\pi ft + \theta)$. In time domain and in a given OFDM symbol, the 2 mirror pilots span a unique direction determined by the complex constant $a_i$. If L symbols are transmitted, the total (or average, or cumulated) power in a direction ϕ is $\Sigma_i |\Re\ a_i \exp(-j\phi)|^2 = 0.5 L + 0.5 \Re \exp(-2j\phi) \Sigma_i a_i a_i$. This power is constant in any direction ϕ if and only if $\Sigma_i a_i a_i \equiv \Sigma_i p_i p_{im} = 0$. Uniform spanning of the complex plane is achieved.

IQ Imbalance Estimation

After estimating the global channel h', the estimation of the global imbalance parameter $\beta_m$' is considered. Careful analysis of equation (12) reveals that this parameter can be obtained in manner very similar way to the conventional channel estimation. That is, $\beta_m$' can be treated like a "channel" carrying the pilot $p_m$*. Hence, by de-rotating by $p_m$, an estimate of the imbalance may be obtained. The condition for unbiased estimation of the imbalance is identical to equation (14).

In summary, using unbiased training sequences and two conventional channel estimations, good estimates of the end-to-end channel and imbalance parameter are obtained (Table 2).

TABLE 2

Estimation algorithm

| H' | $\beta'_m$ |
|---|---|
| Derotate by p* | Derotate by $p_m$ |

Smoothing Over Adjacent Subcarriers

In addition to averaging over adjacent OFDM symbols, the channel estimate may be smoothed over adjacent subcarriers within one symbol. In OFDM, the cyclic prefix is designed to be short, and the channel is supposed to vary slowly from tone to tone. Likewise, the filters in the RF chain should have short temporal response and their frequency response also varies slowly, i.e., the IQ imbalance varies slowly across subcarriers. The same channel smoothing techniques can be used to smooth and improve the imbalance parameter estimate. By using unbiased training sequences, there is no interaction between the channel estimate and the imbalance estimate. Each estimated can be independently smoothed.

If a unique OFDM symbol is used for estimation, it is impossible to find an unbiased training sequence that satisfies equation (14). In this case, a nearly unbiased training sequence can be obtained by applying the summation from equation (14) over groups of 2 or more adjacent subcarriers. Then smoothing automatically cancels all or part of the interference from mirror frequencies. One solution is to rotate the pilot by 90 degrees on the adjacent subcarrier (moving in mirror directions on the positive and negative frequencies).

Estimation

The use of unbiased training sequences and the above-mentioned conventional channel estimation results is a Least Squares (LS) estimator. Of all the LS estimators, the Minimum Mean Squared Error (MMSE) sense shows significant value.

Least Squares Estimator

L transmissions $X_i$, L noise terms $N_i$ and L observations $Y_i$, may be respectively concatenated into the 2 by L matrices $$\chi = (X_1 X_2 \ldots X_L)$$

$$N = (N_1 N_2 \ldots N_L)$$

$$Y = (Y_1 Y_2 \ldots Y_L) \quad (16)$$

Then, equation (12) becomes $$Y = H'\chi + N \quad (17)$$

The unknown is H'. The LS estimator is $$\hat{H}' = Y X^H (X X^H)^{-1} \quad (18)$$

When condition (14) is satisfied, it is easy to verify that $\chi \chi^H$ is diagonal (the cross terms vanish). It is proportional to an identity matrix since the pilots are normalized to unit norm. Then $$\hat{H}' = Y X^H / L = 1/L \Sigma i\, Y_i X_i^H \quad (19)$$

is precisely four conventional channel estimations with de-rotations respectively by $p_i^*$, $p_{im}$, $p_{im}^*$ and $p_i$ as described in the previous section. Two estimations are obtained for frequency f, and two estimations for mirror frequency −f.

Optimal Estimator

Unbiased training sequences and conventional channel estimations are an LS estimator. But any estimator $\hat{H}' = Y X^H (X X^H)^{-1}$ is also an LS estimator. Below, it is shown that the use of unbiased training sequences results in an excellent estimator. Model (17) can be viewed as unknown information H' sent via 2 consecutive transmissions over 2 vectors (rows of $\chi$) in an L dimension space. We denote by $X_j$, $N_j$, and $Y_j$ respectively row j of $\}$ X, N and Y, where $j \in \{1,2\}$. Models (12) and (17) can be written $$y_1 = h'\chi_1 + \beta'_m \chi_2 + N_1$$

$$y_2 = \beta'\chi_1 + h'_m \chi_2 + N_2 \quad (20)$$

There are 2 transmissions, each involving the 2 vectors $X_1$, $X_2$, and where each vector is carrying complex amplitude information to be estimated. The LS estimator consists of projecting onto each vector, in a parallel way to the other vector in order to cancel interference. A very good result is obtained when the 2 vectors are orthogonal, i.e., when dot product (14) is zero. Unbiased training sequences are by definition, training sequences that verify this condition. Other sequences use non-orthogonal vectors and suffer a loss of performance function of the angle between the vectors $X_1$ and $X_2$. Many OFDM systems currently use a very poor kind of training sequences where $X_1$, $X_2$ are collinear, and it is impossible to properly estimate the 4 entries in H'. These training sequences tend to estimate noisier versions of the channels h' and $h'_m$.

To calculate the Mean Squared Errors (MSE), the estimation error is $\hat{H}' - H' = N X^H (X X^H)^{-1}$. This is a 2 by 2 matrix, i.e., 4 error values. Each value can be isolated by multiplying left and right with combinations of the vectors $(1\ 0)^T$ and $(1\ 0)^T$. Assuming $E N N^H$ is an identity matrix, or more generally a diagonal matrix with elements $\sigma^2$ and $\sigma_m^2$, it can be shown that the MSE of $\hat{h}'$ and $\hat{\beta}'_m$ are, respectively, the first and second diagonal elements of $\sigma^2 (\chi \chi^H)^{-1}$. And for $\beta'$ and $\hat{h}_m'$, the MSE are, respectively, the first and second diagonal element of $\sigma_m^2 (\chi \chi^H)^{-1}$.

The total MSE is $2(\sigma^2 + \sigma_m^2) \text{tr}(\chi \chi^H)^{-1}$. Now the problem is to find $\chi$ that minimizes $\text{tr}(\chi \chi^H)^{-1}$ subject to the constraint that total pilot power is constant, i.e., $\text{tr}(\chi \chi^H) = 2L$. Using an Eigen decomposition, the problem can be written as minimize $\Sigma 1/\lambda_j$ subject to $\Sigma \lambda_j$ is constant. The problem is solved with the Lagrange multipliers, and is typically optimum when all Eigen values are equal. This means $\chi \chi^H = LI$ is proportional to an identity matrix.

The total MSE has been minimized, and the resulting MSE per element is either $\sigma^2/L$ or $\sigma_m^2/L$. But this MSE per element is likely to be the best that can be obtained, even if a unique vector transmission is used. The MSE is unlikely to be improved for a 2 vector transmissions, and therefore the MSE per element has been minimized. The unbiased training sequences plus conventional channel estimator are the MMSE of all LS estimators.

IQ Imbalance Compensation

If the gain from the unbiased channel estimate is not enough, the IQ imbalance parameters may be estimated (as described previously) and applied to compensate for data distortion. H' is estimated in model (12), Y=H'X+N. Now the focus turns to the unknown data X. The model is the same as any 2-tap channel with cross-correlations. Any channel equalization algorithm can be fitted. A simple equalization algorithm is presented suitable for the ubiquitous bit-interleaved coded QAM and fading channels.

One concern with the Zero-Forcing (ZF) approach $H'^{-1}Y = X + H'^{-1}N$ is that it enhances noise when the mirror channel is weak, unless an accounting is made for the complicated colored noise. The present solution uses ZF, but only when the mirror channel is not weak. In equation (12), replacing $x_m$ by its value, the following is obtained $$y = (h' - \beta_m'\beta'^*/h_m'^*)x + (\beta_m'/h_m'^*)y_m^* - (\beta_m'/h_m'^*)n_m^* + n \approx h'x + (\beta_m'/h_m'^*)y_m^* + n' + n \quad (21)$$

where $n' \triangleq -(\beta_m'/h_m'^*)n_m^*$ is noise enhancement. Note: it is assumed the second order imbalance term $\beta'^*\beta_m' \ll h'h_m'^*$. When this approximation is invalid, the corrected channel $h'_c \triangleq h' - \beta_m'\beta'^*/h_m'^*$ is considered, which entails precise estimation of the channel and imbalance parameters.

Basically, the ZF technique consists of computing $$z = y - (\beta_m'/h_m'^*)y_m^* \approx h'x + n' + n \quad (22)$$

By subtracting the mirror frequency quantity $(\beta_m'/h_m')y_m$ from the received signal y, the simple channel model with no IQ imbalance is obtained. The rest of the decoding chain is unchanged.

This solution works well as long as the noise enhancement is weaker than the original interference from IQ imbalance, i.e., $|n'|^2 < |\beta_m'x_m^*|^2$. If not, then the original y is used rather than the imbalance corrected z. It is unnecessary to estimate n' in order to make a decision. A robust average-wise improvement may be elected. So, considering the expected values $$E|n'|^2 = (|\beta m'|2/|hm'|2)E|nm|2 < |\beta m'|2E|xm^*|2 \quad (23)$$
$$\rightarrow |hm'|2^{\frac{E|x_m^*|2}{E|\eta_m|2}} \frac{E|x_m^*|2}{E|\eta_m|2} \square SNRm > 1.$$

When the mirror frequency's signal to noise ratio $SNR_m$ is greater than 1, the imbalance corrected term z is used. Otherwise, the original signal y is kept. Due to channel and imbalance estimation imprecision, it is safer to use a larger SNR, for example, $SNR_m > 2$ works well for WiMedia UWB. Note that $SNR_m$ can usually be obtained from the global SNR via the formula $SNR_m = |h_m'|^2 SNR$.

Table 3 summarizes the ZF algorithm with noise enhancement avoidance.

TABLE 3

| Compensation algorithm | |
| --- | --- |
| $SNR_m < 1 + \delta$ | $SNR_m > 1 + \delta$ |
| z = y | $z = y - (\beta_m'/h_m')y_m$ |

Simulation Results

Figure 10:
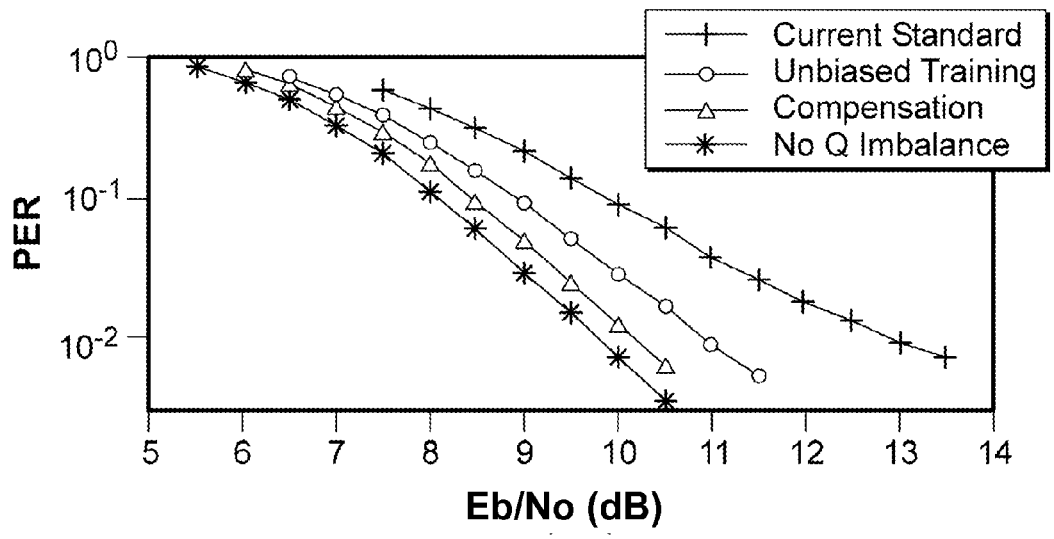
FIG. 10 depicts the performance achieved by applying the above-described algorithms to the WiMedia UWB standard.

FIG. 10 depicts the performance achieved by applying the above-described algorithms to the WiMedia UWB standard. The highest data rate, 480 Mbps, is simulated in IEEE 802.15.3's channel model CM2 (indoor pico-environment of about 4 meters). Shadowing and band hopping are turned off. The IQ imbalance is constant and equal to $2\epsilon = 10\%$ (0.8 dB) in amplitude and $2\Delta\phi = 10$ degrees in phase. The same amount of imbalance is present at the transmitter and receiver. The figure shows the Packet Error Rate (PER) as a function of Eb/No. The performance degrades quickly without any form of compensation. Table 4 lists the loss of various algorithms with respect to ideal case.

TABLE 4

| WiMedia UWB: loss from IQ imbalance at PER of $10^{-2}$ | | |
| --- | --- | --- |
| Current Standard | Unbiased Training | Compensation |
| 3.1 dB | 1.1 dB | 0.35 dB |

End-to-end IQ imbalance and channel combine to form a global 2 by 2 channel matrix. The use of unbiased training sequences achieves considerable gains at no cost. The unbiased training sequences automatically cancel end-to-end self-generated interference from the channel estimate. Moreover, such training sequences are ideal for estimating IQ imbalance parameters, and a simple algorithm is given to compensate for data distortion: Zero-Forcing with noise enhancement avoidance.

WiMedia UWB, in particular, benefits from the following enhancement: the conventional biased training sequence that consists of 6 symbols exclusively transmitted on the I channel can be divided in 2 halves to create an unbiased sequence. The first 3 symbols are sent on the I channel, and the last 3 symbols are sent on the Q channel. By uniformly spanning the complex plane, an unbiased training sequence is created with large gains for high data rates. For backward compatibility, this scheme may be reserved for high data rate modes and signaled via the beacons, or the training sequence type may be blindly detected.

In OFDMA (e.g., WiMAX), the subcarriers f and −f can be assigned to different users. Considerable interference can arise if power control drives one user to high power level. It is therefore a good idea to locate the pilots of different users on mirror subcarriers. The pilots should satisfy the unbiased training sequence criterion. Each user automatically benefits without any extra effort. The pilots may hop to different locations while maintaining mirror positions.

The time domain formulas can be extended to Code Division Multiple Access (CDMA) with a Rake equalizer combining several one-tap channels. Unbiased training sequences automatically improve the channel estimate per tap. A simple unbiased training sequence for CDMA consists of constantly rotating the complex symbols by 90 degrees.

Figure 11A:
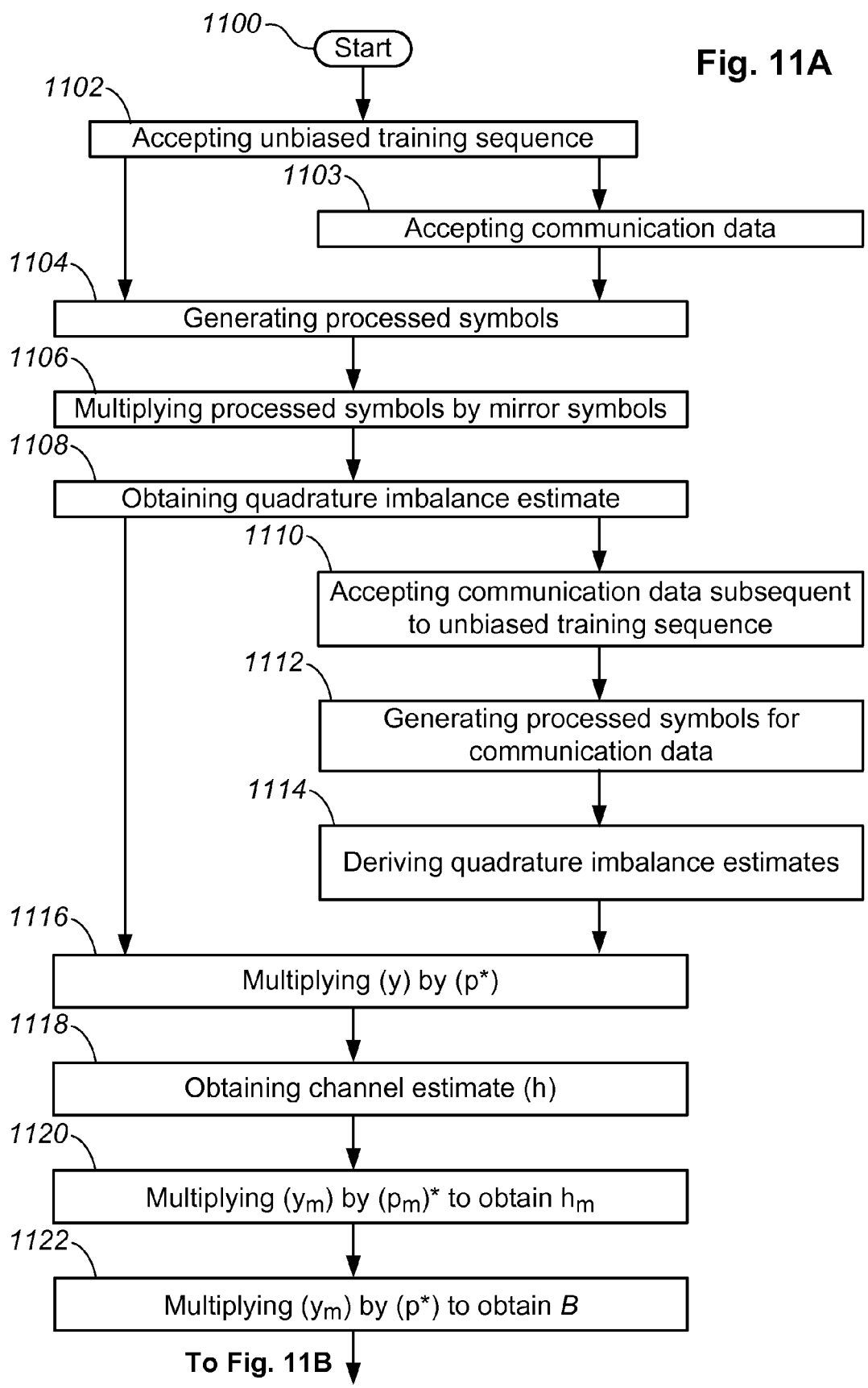
FIGS. 11A and 11B are flowcharts illustrating a method for removing quadrature imbalance errors in received data.
Figure 11B:
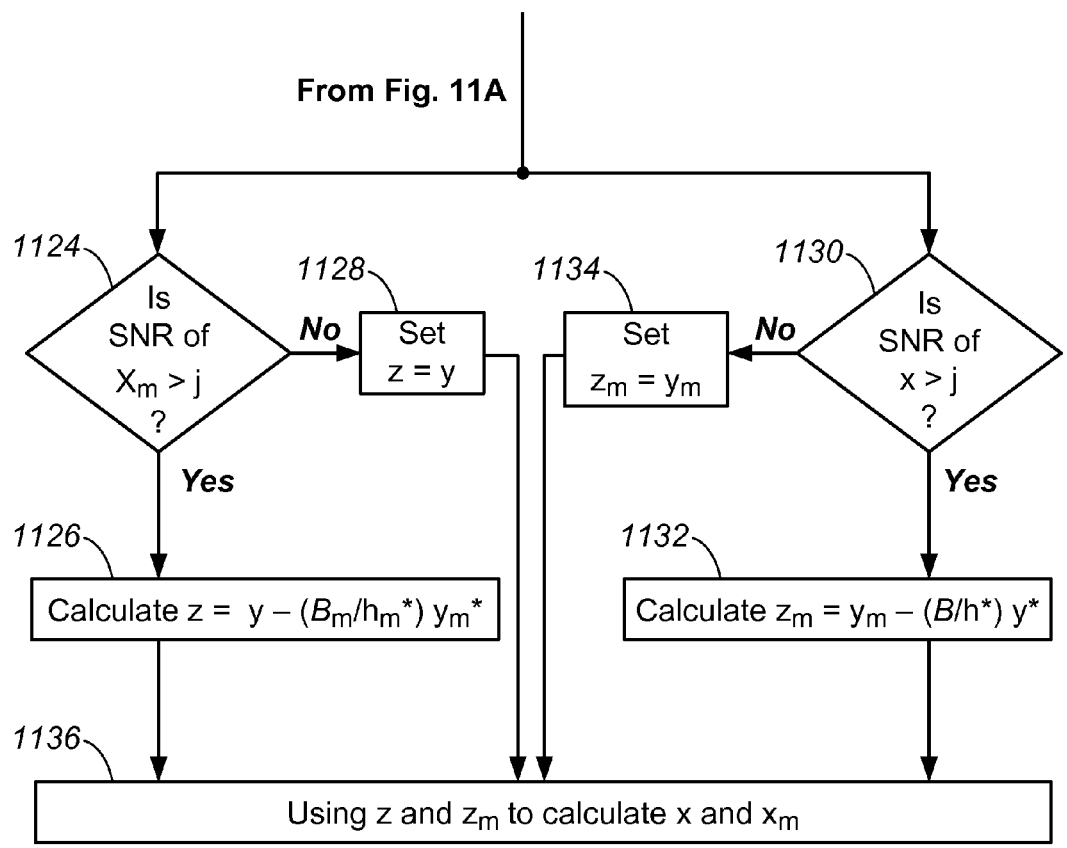

FIGS. 11A and 11B are flowcharts illustrating a method for removing quadrature imbalance errors in received data. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. As used herein, the terms "generating", "deriving", and "multiplying" refer to processes that may be enabled through the use of machine-readable software instructions, hardware, or a combination of software and hardware. The method starts at Step 1100.

Step 1102 accepts an unbiased training sequence in a quadrature demodulation receiver. The unbiased training sequence has a uniform accumulated power evenly distributed in a complex plane, and includes predetermined reference signals (p) at frequency +f and predetermined mirror signals ($p_m$) at frequency −f. As explained in detail above, the unbiased training sequence is a temporal sequence of complex plane symbols with equal accumulated power in a plurality of directions. Alternately, Step 1102 accepts a signal pair including a complex value reference signal (p) at frequency +f and a complex value mirror signal ($p_m$) at frequency −f, where the product ($p \cdot p_m$) is null. For example, i occurrences of the reference signal (p) and the mirror signal ($p_m$) may be accepted, where the sum of the products ($p_i \cdot p_{im}$) is null.

Step 1104 processes the unbiased training sequence, generating a sequence of processed symbols (y) at frequency +f, representing complex plane information in the unbiased training sequence. Step 1106 multiplies each processed symbol (y) by the mirror signal ($p_m$). Step 1108 obtains an unbiased quadrature imbalance estimate $B_m$ at frequency −f.

In one aspect, Step 1102 accepts an unbiased training sequence with a plurality of simultaneously accepted predetermined reference signals and a plurality of simultaneously accepted predetermined mirror signals ($p_{nm}$). Likewise, Step 1104 generates a plurality of signals ($y_n$) from the corresponding plurality of reference signals ($p_n$). Step 1106 multiplies each received symbol ($y_n$) by its corresponding mirror signal ($p_{nm}$), and Step 1108 obtains a plurality of unbiased quadrature imbalance estimates ($B_{nm}$) from the corresponding plurality of ($y_n$)($p_{nm}$) products.

For example, Step 1102 may accept P pilot symbols per symbol period, in a plurality of symbol periods, and Step 1108 obtains P pilot channel quadrature imbalance estimates per symbol period. In this aspect, Step 1103 simultaneously accepts (N−P) quadrature modulated communication data symbols in each symbol period (also see FIG. 6). Then, generating processed symbols in Step 1104 includes generating a processed symbol ($y_c$) for communication data in each symbol period. Likewise, deriving quadrature imbalance estimates in Step 1108 includes deriving quadrature imbalance estimates ($B_m$) for each processed symbol ($y_c$) from the pilot channel quadrature imbalance estimates.

In another aspect, Step 1102 accepts a temporal sequence of n predetermined mirror signals ($p_{nm}$) and n predetermined reference signals ($p_n$). Generating the sequence of processed symbols (y) in Step 1104 includes generating a temporal sequence of n processed symbols ($y_n$). Then, obtaining the unbiased quadrature imbalance estimate ($B_{nm}$) in Step 1108 includes obtaining a sequence of n quadrature imbalance estimates, and averaging the n quadrature imbalance estimates.

For example (see FIG. 7), Step 1102 may accept the unbiased training sequence on a first subcarrier, and Step 1108 obtains the quadrature imbalance estimate for the first subcarrier. Then, Step 1110 accepts quadrature modulated communication data on the first subcarrier in symbol periods subsequent to accepting the unbiased training sequence. Step 1112 generates a processed symbol ($y_c$) for each communication data symbol, and Step 1114 derives a quadrature imbalance estimates ($B_m$) for each processed symbol ($y_c$).

In other aspect the method includes the following additional steps. Step 1116 multiplies the processed symbol (y) by a conjugate of the reference signal (p*). Step 1118 obtains an unbiased channel estimate (h) at frequency +f. Processing the unbiased training sequence in Step 1104 includes generating a sequence of processed symbols ($y_m$) at frequency −f. Then, Step 1120 multiplies symbol ($y_m$) by ($p_m$*) to obtain channel estimate $h_m$ at frequency (−f), and Step 1122 multiplies symbol $y_m$ by p* to obtain quadrature imbalance estimate B at frequency +f.

If the signal-to-noise ratio (SNR) of ($x_m$) is greater than j (Step 1124), then Step 1126 calculates an imbalance-corrected symbol $(z) = y - (B_m/h_m^*)y_m^*$. Otherwise, Step 1128 sets (z) equal to (y). If the SNR of (x) is greater than j (Step 1130), then Step 1132 calculates $(z_m) = y_m - (B/h^*)y^*$. Otherwise, Step 1134 sets ($z_m$) equal to ($y_m$). Step 1136 uses (z) and ($z_m$) in the calculation of (x) and ($x_m$), respectively. In one aspect, j=1.

The above-described flowchart may also be interpreted as an expression of a machine-readable medium having stored thereon instructions for removing quadrature imbalance errors in received data. The instructions would correspond to Steps 1100 through 1136, as explained above.

Systems, methods, devices, and processors have been presented to enable the removal of quadrature imbalance errors in received data. Examples of particular communications protocols and formats have been given to illustrate the invention. However, the invention is not limited to merely these examples. Other variations and embodiments of the invention will occur to those skilled in the art.

What is claimed is:

1. A method of communication, the method comprising:
receiving a training signal at a quadrature demodulation receiver, the training signal representing a plurality of predetermined reference values at a frequency +f or a frequency adjacent to the frequency +f and a plurality of corresponding predetermined mirror values at a frequency −f or a frequency adjacent to the frequency −f, wherein the sum of the products of each predetermined reference value and the corresponding predetermined mirror value is zero;
generating a plurality of received values based on the received portion of the training signal representing the predetermined reference values at the frequency +f or the frequency adjacent to the frequency +f;
generating a plurality of derotation values by multiplying each received value by the corresponding predetermined mirror value; and
averaging the derotation values so as to obtain a quadrature imbalance estimate for the frequency −f or the frequency adjacent to the frequency −f.

2. The method of claim 1, wherein the received training signal represents at least a first predetermined reference value at the frequency +f, a second predetermined reference value at the frequency adjacent to the frequency +f, a first corresponding predetermined mirror value at the frequency −f, and a second corresponding predetermined mirror value at the frequency adjacent to the frequency −f and wherein the sum of the first predetermined reference value multiplied by the first corresponding predetermined mirror value and the second predetermined reference value multiplied by the second corresponding predetermined mirror value is zero.

3. The method of claim 1, wherein the received training signal represents at least a first predetermined reference value at the frequency +f received at a first time, a second predetermined reference value at the frequency +f received at a second time after the first time, a first corresponding predetermined mirror value at the frequency −f received at the first time, and a second corresponding predetermined mirror value at the frequency −f received at the second time and wherein the sum of the first predetermined reference value multiplied by the first corresponding predetermined mirror value and the second predetermined reference value multiplied by the second corresponding predetermined mirror value is zero.

4. The method of claim 1, further comprising:
generating a plurality of second derotation values by multiplying each received value by the conjugate of the corresponding predetermined reference value; and
averaging the second derotation values so as to obtain a channel estimate for the frequency +f or the frequency adjacent to the frequency +f.

5. The method of claim 1, further comprising:
generating a plurality of second received values based on the received portion of the training signal representing the predetermined mirror values at the frequency −f or the frequency adjacent to the frequency −f;
generating a plurality of third derotation values by multiplying each second received value by the corresponding predetermined reference value; and
averaging the third derotation values so as to obtain a quadrature imbalance estimate for the frequency +f or the frequency adjacent to the frequency +f.

6. The method of claim 1, further comprising:
generating a plurality of second received values based on the received portion of the training signal representing the predetermined mirror values at the frequency −f or the frequency adjacent to the frequency −f;
generating a plurality of fourth derotation values by multiplying each second received value by the conjugate of the predetermined mirror value; and
averaging the fourth derotation values so as to obtain a channel estimate for the frequency −f or the frequency adjacent to the frequency −f.

7. The method of claim 1, further comprising:
receiving a data signal at the quadrature demodulation receiver, the data signal representing at least a plurality of data values at frequency +f;
generating a plurality of received data values based on the received portion of the data signal representing the data values at the frequency +f; and
generating a plurality of compensated data values based on the received data values and the quadrature imbalance estimate.

8. The method of claim 7, wherein:
receiving a data signal comprises receiving data signal representing a plurality of data values at frequency +f and a plurality of corresponding mirror data values at frequency −f;
generating a plurality of received data values further comprises generating a plurality of received corresponding mirror data values based on the received portion of the data signal representing the corresponding mirror data values at frequency −f; and
generating a plurality of compensated data values comprises subtracting, from each received data value, a value proportional to the quadrature imbalance estimate and the received corresponding mirror data value.

9. The method of claim 7, further comprising determining that signal-to-noise ratio is greater than a threshold, wherein generating a plurality of compensated data values comprises generating a plurality of compensated data values in response to the determination.

10. A system for communication, the system comprising:
a receiver configured to receive a training signal, the training signal representing a plurality of predetermined reference values at a frequency +f or a frequency adjacent to the frequency +f and a plurality of corresponding predetermined mirror values at a frequency −f or a frequency adjacent to the frequency −f, wherein the sum of the products of each predetermined reference value and the corresponding predetermined mirror value is zero; and
a processor configured to:
generate a plurality of received values based on the received portion of the training signal representing the predetermined reference values at the frequency +f or the frequency adjacent to the frequency +f,
generate a plurality of derotation values by multiplying each received value by the corresponding predetermined mirror value, and
average the derotation values so as to obtain a quadrature imbalance estimate for the frequency −f or the frequency adjacent to the frequency −f.

11. The system of claim 10, wherein the received training signal represents at least a first predetermined reference value at the frequency +f, a second predetermined reference value at the frequency adjacent to the frequency +f, a first corresponding predetermined mirror value at the frequency −f, and a second corresponding predetermined mirror value at the frequency adjacent to the frequency −f and wherein the sum of the first predetermined reference value multiplied by the first corresponding predetermined mirror value and the second predetermined reference value multiplied by the second corresponding predetermined mirror value is zero.

12. The system of claim 10, wherein the received training signal represents at least a first predetermined reference value at the frequency +f received at a first time, a second predetermined reference value at the frequency +f received at a second time after the first time, a first corresponding predetermined mirror value at the frequency −f received at the first time, and a second corresponding predetermined mirror value at the frequency −f received at the second time and wherein the sum of the first predetermined reference value multiplied by the first corresponding predetermined mirror value and the second predetermined reference value multiplied by the second corresponding predetermined mirror value is zero.

13. The system of claim 10, wherein the processor is further configured to generate a plurality of second derotation values by multiplying each received value by the conjugate of the corresponding predetermined reference value and average the second derotation values so as to obtain a channel estimate for the frequency +f or the frequency adjacent to the frequency +f.

14. The system of claim 10, wherein the processor is further configured to:
generate a plurality of second received values based on the received portion of the training signal representing the predetermined mirror values at the frequency −f or the frequency adjacent to the frequency −f,
generate a plurality of third derotation values by multiplying each second received value by the corresponding predetermined reference value, and
average the third derotation values so as to obtain a quadrature imbalance estimate for the frequency +f or the frequency adjacent to the frequency +f.

15. The system of claim 10, wherein the processor is further configured to:
generate a plurality of second received values based on the received portion of the training signal representing the predetermined mirror values at the frequency −f or the frequency adjacent to the frequency −f,
generate a plurality of fourth derotation values by multiplying each second received value by the conjugate of the predetermined mirror value, and
average the fourth derotation values so as to obtain a channel estimate for the frequency −f or the frequency adjacent to the frequency −f.

16. The system of claim 10, wherein the receiver is further configured to receive a data signal representing at least a plurality of data values at frequency +f and the processor is further configured to generate a plurality of received data values based on the received portion of the data signal representing the data values at the frequency +f and generate a plurality of compensated data values based on the received data values and the quadrature imbalance estimate.

17. The system of claim 16, wherein the data signal represents a plurality of data values at frequency +f and a plurality of corresponding mirror data values at frequency −f and the processor is configured to generate a plurality of received corresponding mirror data values based on the received portion of the data signal representing the corresponding mirror data values at frequency −f and to generate the plurality of compensated data values by subtracting, from each received data value, a value proportional to the quadrature imbalance estimate and the received corresponding mirror data value.

18. The system of claim 16, wherein the processor is configure to determine that signal-to-noise ratio is greater than a threshold and to generate the plurality of compensated data values in response to the determination.

19. A system for communication, the system comprising:
means for receiving a training signal at a quadrature demodulation receiver, the training signal representing a plurality of predetermined reference values at a frequency +f or a frequency adjacent to the frequency +f and a plurality of corresponding predetermined mirror values at a frequency −f or a frequency adjacent to the frequency −f, wherein the sum of the products of each predetermined reference value and the corresponding predetermined mirror value is zero;

means for generating a plurality of received values based on the received portion of the training signal representing the predetermined reference values at the frequency +f or the frequency adjacent to the frequency +f;

means for generating a plurality of derotation values by multiplying each received value by the corresponding predetermined mirror value; and means for averaging the derotation values so as to obtain a quadrature imbalance estimate for the frequency −f or the frequency adjacent to the frequency −f.

20. A computer-readable non-transitory medium having instructions encoded thereon which, when executed by a computer, cause a system to perform a method of communication, the method comprising:

receiving a training signal at a quadrature demodulation receiver, the training signal representing a plurality of predetermined reference values at a frequency +f or a frequency adjacent to the frequency +f and a plurality of corresponding predetermined mirror values at a frequency −f or a frequency adjacent to the frequency −f, wherein the sum of the products of each predetermined reference value and the corresponding predetermined mirror value is zero;

generating a plurality of received values based on the received portion of the training signal representing the predetermined reference values at the frequency +f or the frequency adjacent to the frequency +f;

generating a plurality of derotation values by multiplying each received value by the corresponding predetermined mirror value; and averaging the derotation values so as to obtain a quadrature imbalance estimate for the frequency −f or the frequency adjacent to the frequency −f.

* * * * *